(12) United States Patent (10) Patent No.: US 12,572,870 B2
Notani (45) Date of Patent: Mar. 10, 2026

(54) SYSTEM AND COMPUTER PROGRAM FOR PROVIDING INTELLIGENT PRESCRIPTIVE ANALYTICS

(71) Applicant: One Network Enterprises, Inc., Dallas, TX (US)

(72) Inventor: Ranjit Notani, Plano, TX (US)

(73) Assignee: Blue Yonder Defense Solutions, LLC, Dallas, TX (US)

( * ) Notice: Subject to any disclaimer, the term of this patent is extended or adjusted under 35 U.S.C. 154(b) by 34 days.

(21) Appl. No.: 17/189,774

(22) Filed: Mar. 2, 2021

(65) Prior Publication Data

US 2022/0284361 A1 Sep. 8, 2022

(51) Int. Cl.
*G06Q 10/0637* (2023.01)
*G06Q 10/087* (2023.01)

(52) U.S. Cl.
CPC ....... *G06Q 10/0637* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 8,352,300 | B2 * | 1/2013 | Notani | G06Q 10/087 |
| | | | | 705/7.42 |
| 10,235,336 | B1 * | 3/2019 | Bir | G06F 16/24578 |
| 2014/0310049 | A1 * | 10/2014 | Goel | G06Q 10/083 |
| | | | | 705/7.24 |
| 2015/0235171 | A1 * | 8/2015 | Parris | G06Q 10/0833 |
| | | | | 705/333 |
| 2018/0158020 | A1 * | 6/2018 | Khasis | G01C 21/343 |
| 2018/0211212 | A1 * | 7/2018 | Chin | G06Q 10/087 |
| 2021/0019791 | A1 * | 1/2021 | Selvaraj | G06Q 30/0281 |

* cited by examiner

*Primary Examiner* — Cory W Eskridge
(74) *Attorney, Agent, or Firm* — Miller Johnson

(57) ABSTRACT

A system includes multiple remote computers in communication with multiple remote users. A service provider computer in communication with a shared database is configured to determine a real-time state of the system, receive a real-time update to the state of the system and, upon receipt of the update, determine a potential prescription. In response to a prescriptive outcome being inferred, the potential prescription is set based on the inferred prescriptive outcome; otherwise, the potential prescription is set based on a simulated prescriptive outcome. The simulated prescriptive outcome determination includes creating a simulation via a network scratchpad, determining potential simulation prescription outcomes within the network scratchpad, determining a potential prescription based on the one or more potential simulation prescription outcomes, and removing the network scratchpad. In response to determining that the potential prescription is within a predefined prescription value threshold, the potential prescription is added to a potential prescription list.

16 Claims, 47 Drawing Sheets

FIG. 1A
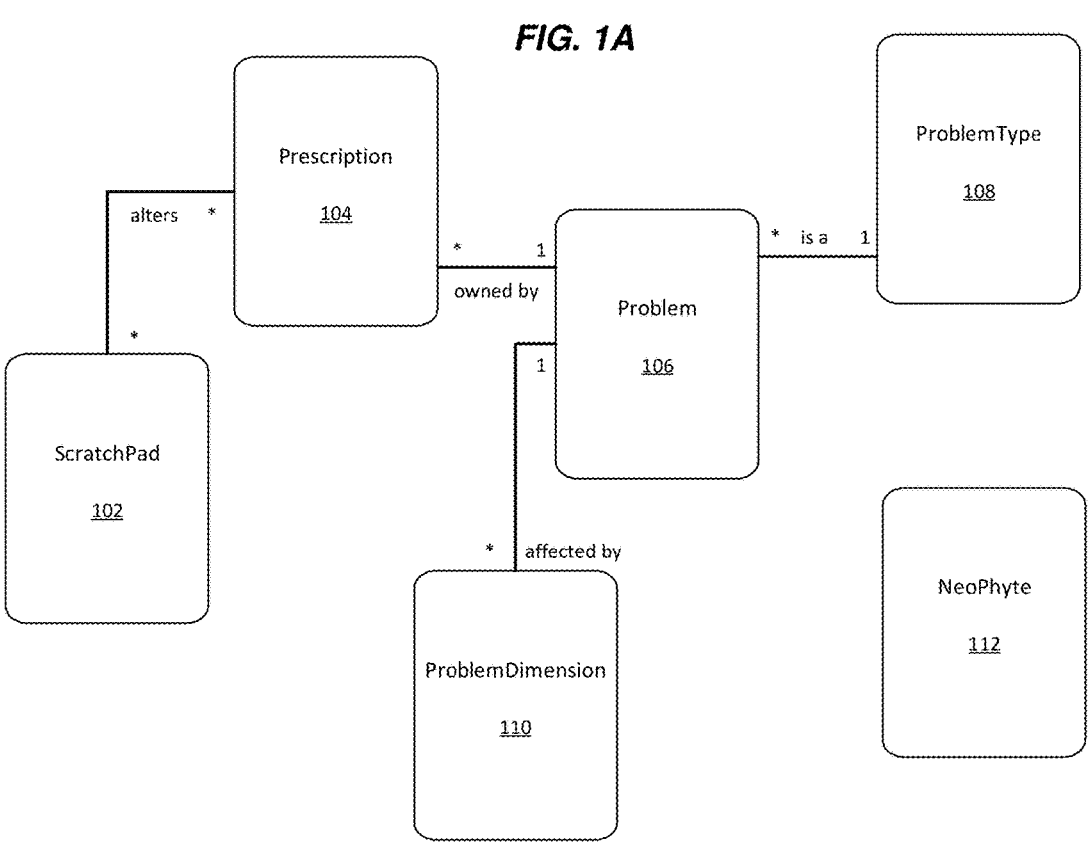
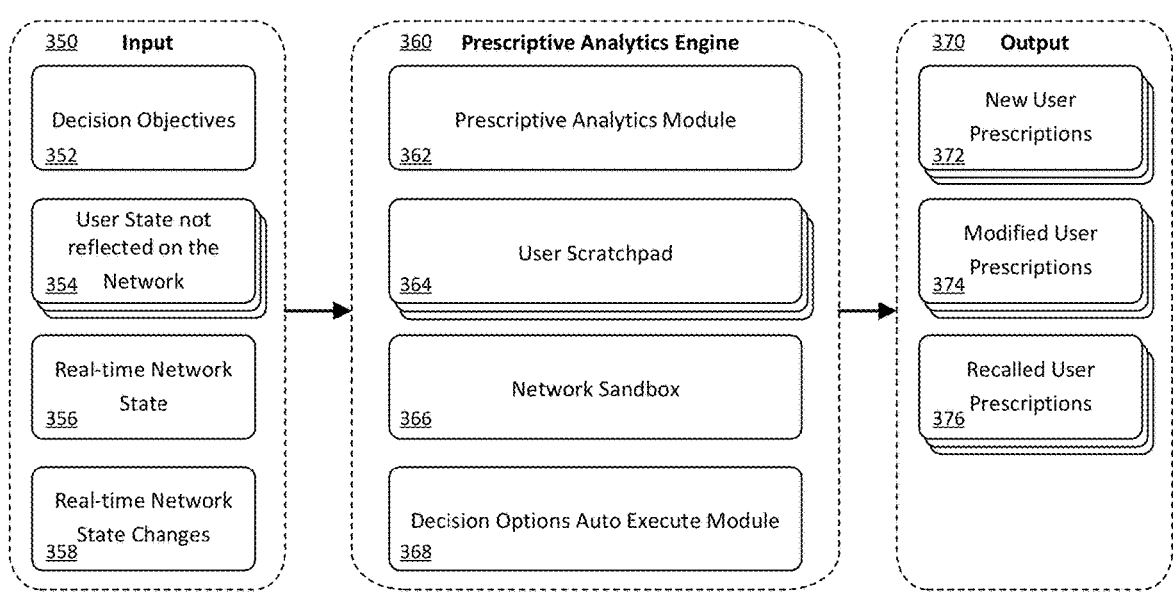
FIG. 1B

Prescription Schema

| Field | Type | Key? | Description |
|---|---|---|---|
| Id | Integer | X | Unique Identifier, not semantically significant, autogenerated |
| Name | String | | A fully-qualified name, like OMS.ExpeditePurchaseOrder, which identifies the type of prescription used to solve the problem. |
| Type | String Enumeration | | Full = can be executed without input. InputRequired = can be executed, but only with user input. NarrativeOnly = cannot be executed per se. Instead, provides a narrative for the prescription of things a user can do to solve the problem manually |
| Owner | ModelLink<Problem> | | Reference to a model that "owns" this prescription. This will primarily be instances of Problem, but other Owners are also possible. Generally used to represent the problem being solved, or the primary model being affected by the prescription. |
| PrescriptionHandler | String | | Optional fully-qualified classname implementing a PrescriptionHandler interface. This code will be executed when the prescription is "run" by a user or other backend process. |
| SupportingData | String | | Optional JSON-formatted string containing any additional data that is useful to the prescription at runtime. |
| Value | Double | | A higher value Prescription is considered more "valuable" than a lower value Prescription. This could be a dollar value, or could be a conceptual value. The highest value Prescription of type "Full" would be what is used when bulk resolving problems. |

*FIG. 2A*

ProblemType Schema

| Field | Type | Key? | Description |
|---|---|---|---|
| Name | String | X | Unique identifier for the ProblemType, e.g. "ProjectedLostSales" |
| Attribute1Type | String Enum | | Attribute1..3Type are used to identify the type of three optional attributes specific to this problem type and not necessarily present on others. For example, for projected lost sales, we might capture the lost sales amount as a float, the number of days left to recover as an int, etc. |
| Attribute1Name | String | | Attribute1..3Name are used to capture the names of the 3 attributes for the 3 types. (See Attribute1Type for details) |
| Attribute2Type | String Enum | | |
| Attribute2Name | String | | |
| Attribute3Type | String Enum | | |
| Attribute3Name | String | | |

*FIG. 2B*

ProblemType Schema

| Field | Type | Key? | Description |
|---|---|---|---|
| Problem | ModelLink<Problem> | X | Model Link to the Problem whose dimensions are being described. |
| DimId | Long | X | Because the number of available dimensions may change over time and we don't want to change the NK of this model, we will use a synthetic autoincremented key as the NK for WBProblemDimension. |
| DimType | StringEnumeration | | Possible values: Organization, Item, Site. |
| DimId | Long | | Id of the specific Org, Item or Site |

*FIG. 2C*

Problem Schema

| Field | Type | Key? | Description |
|---|---|---|---|
| ProblemType | ModelLink<ProblemType> | X | Reference which identifies what type of problem this is. |
| ProblemId | String | X | Arbitrary string which uniquely identifies the problem within its type. Often will just be the surrogate id of the primary model for the problem. Will never be shown to the user. |
| Assignee | ModelLink<User> | | |
| Attribute1 | String | | Attribute value which matches the type/name defined in the associated ProblemType |
| Attribute2 | String | | " |
| Attribute3 | String | | " |
| AutoState | Boolean | | Determines whether this WBProblem is currently "ON/true" (i.e. is currently a Problem) or "OFF/false" (i.e. has been obviated by subsequent events). |
| AutoStateLastUpdated | Timestamp | | Indicates the last time when the AutoState of this WBProblem was automatically updated by the system. |
| DueDate | Timestamp | | Optional tentative date for problem to be finished. User can set the due date from the problem details screen |
| ExpiryDate | Timestamp | | On this date, the Problem expires and is no longer relevant . It shouldn't be shown by the workbench as a current, active problem (but may be searchable as history.) Workbench fmk may archive expired events after some interval. |
| ModelRef | Reference ("Generic Model Link") | | Reference to the primary data model affected by this Problem (e.g. a site, an order, an invoice) |
| OwningOrganization | ModelLink<Organization> | | The Owner of the problem has final authority on problem resolution, and potentially on giving other participants permission to resolve the problem. Things like point value, problem name, etc are from the Owner's perspective. |
| Resolution | String | | User-provided explanation of resolution when problem is resolved. |
| State | String enumeration | | Problems have a state machine which includes Pending, In Progress, Cancelled and Closed. |

FIG. 2D

NeoPhyte Schema

| Field | Type | Key? | Description |
|---|---|---|---|
| Owner | ModelLink<User> | X | User who created & owns this NeoPhyte |
| Name | String | X | User-provided name of the NeoPhyte |
| Search Criteria | String | | JSON-formatted capture of all search parameters used to find the Problems against which the NeoPhyte will execute prescriptions |
| Schedule | String | | JSON-formatted schedule string which identifies the frequency at which the NeoPhyte should run |

FIG. 2E

Scratchpad Schema

| Field | Type | Key? | Description |
|---|---|---|---|
| Subnet | String | X | JSON representation of the "subnet" against which a scratchpad is executed (e.g. site+item) |
| USRO | ModelLink<USRO> | X | Scratchpad applies only for this USer + ROle combination |
| Workbench | String | | Name of the workbench where the user is trying to make changes to data. |
| Actions | String | | JSON representation of actions taken for the scratchpad. These can be kept in memory for "what if" analysis, and then ultimately committed to the database as "real" actions if the scratchpad is approved |

SYSTEM AND COMPUTER PROGRAM FOR PROVIDING INTELLIGENT PRESCRIPTIVE ANALYTICS

BACKGROUND OF THE INVENTION

Field of the Invention

The present invention is generally related to enterprise value chains, and more particularly to a system and computer program for providing intelligent prescriptive analytics.

Discussion of the Background

Today, systems in many industries and fields are increasingly becoming more complex. Likewise, the options and decisions available to optimally manage these industries and fields has also become more complex. In an effort to improve and optimize the operations of such systems, large volumes of data related to such operations is typically collected. The data collected, however, requires some level of data analysis, human interpretation or a combination thereof to be useful. Simply put, the complexity of the tradeoffs that decision makers have to navigate while simultaneously dealing with a fast-changing "reality," make it nearly impossible for anyone to make optimal decisions without the assistance of computer technologies in combination with human interpretation. The present invention relates to systems and methods for merging machine learning and human decision making using prescriptive analytics.

Prescriptive analytics is an alternative or a complement to descriptive and predictive analytics. With descriptive and predictive analytics, human decision makers still have to "compute" what decision to make. Whereas, with prescriptive analytics, decision options are computed by the system and the user has to merely click on them to execute or these decision options may even put into an auto-execute mode. Predictive analytics anticipates what is likely to happen by combining historical data with rules, algorithms, and possibly external data. This information is used to determine the probable future outcome of an event or the likelihood of a particular outcome occurring in the future. Prescriptive analytics recommends actions to benefit from the predictions and the implications of each potential action.

However, prescriptive analytics in the prior art is currently lacking. For instance, in the prior art, recommendations under prescriptive analytics are based on historical data do not account for real-time changes in the state of the complex system. Further, in the prior art, there are no automated recommendations based on real-time changes in such state. There is also not any differentiated characteristics as described below by the present invention in the prior art.

Prescriptive analytics may be utilized in numerous complex industries and fields including without limitation healthcare, supply chain management, financial markets, stock markets, energy industries and the like. Prescriptive analytics may also be utilized without limitation in supply chain networks. In an increasingly global economy, there is a need for computer networks to share information between computer applications and to better adapt to meet the needs of the business enterprise(s) and computer applications using such networks. Business enterprises of all types are faced with the challenge of managing and optimizing ever more complex supply chains. These supply chains, often called "value chains," are characterized by a high degree of collaboration, cooperation, and interdependency between the enterprise and other entities or partners in the chain (e.g., raw materials producers, component manufacturers, distributors, and the like). The business goal of managing and optimizing a value chain is to minimize the costs incurred by all participants in the chain while maintaining a high level of customer service and maximizing profits. In order to achieve this goal, the enterprise strives to reduce the quantity of stored goods in the value chain, while minimizing opportunity loss by maintaining a sufficient inventory level to satisfy customer demand. A typical value chain and/or supply chain may span multiple companies and/or entities and sometimes include hundreds or even thousands of companies and/or entities. In the prior art, each company and/or entity maintained its own separate value chain system. In particular, each company and/or entity maintained its own value chain network locally on its own computer systems, databases and computer programs associated with the value chain network. Even with so-called multi-tier or multi-echelon systems known in the prior art, each company and/or entity maintained its own multi-tier or multi-echelon system. Whatever information was shared between the company and/or entity within the value chain network, would necessarily traverse disparate platforms. The companies would then typically communicate with other companies in the value chain via technically diverse point-to-point connections that employ a variety of transfer technologies such as exchange messages (e.g., EDI), web services, facsimile, phone, email and postal mail.

The disparate arrangement between the companies and/or entities in the value chain networks known in the prior art is inherently flawed introducing numerous issues. It introduces unnecessary communications throughout the disparate networks and requires additional computer hardware and storage. Further, information contained within the value chain network in prior art systems is not the most current and the flow of information from entity to entity is not timely. At the origination point, which is controlled by the source entity, the information to be sent is formatted for transmission and then transmitted. At the receiving end, which is controlled by the receiving entity, the information is received, unpacked, interpreted and finally acted upon. These steps are typically scheduled as periodic batch jobs and are not triggered to run in an event-driven real-time fashion. This introduces undesirable and consequential latency into the information sharing process. Information accuracy within the value chain network is not reliable in prior art systems. What is supposed to be the same information residing within each entity's systems is in fact a set of latency-ridden out of synch copies of the information due to the non-timeliness of the transfer of information between the entities. Because of the duplication of information, there is also no single version of the truth. Copied information that is out of synch with respect to age and content can result in a cascade of calculation and decision errors that ultimately grow into serious problems. Holistic planning and optimizing for a multi-party multi-tier value chain is out of reach in prior art systems primarily because of non-timely and not-reliable information. As such, each company and/or entity optimizes its execution based on its own self-interest which does not yield the holistically optimum solution for the entire value chain network at large.

Further, each company and/or entity had to potentially integrate their own internal value chain with many if not all of the other companies and/or entities in the value chain leading to n2 integrations, where 'n' is the number of companies in the value chain. Such an arrangement required additional time and expense in setting up and managing the value chain, and was highly coupled. Due to the high degree of coupling in the prior art, any changes in the value change typically resulted in extensive modifications throughout the value chain. Due to the size and complexity of most value chains, schedule-driven and batch processing value chain management systems of the prior art often resulted in stale or out of date data being used. This led to expensive reconciliation and significantly limited the types of processes that could be executed. It was also difficult if not impossible to deploy new multi-company processes using the techniques known in the prior art. Further, visibility beyond a company's immediate neighbors was problematic because multi-tier visibility was difficult if not impossible to obtain and to orchestrate.

To meet customer demand, enterprises, such as, without limitation, stores and other retail entities, forecast the future demand of their customers, including, without limitation, other enterprises, the general public and other entities or persons to which the enterprise serves or has a relationship. A sales forecast is utilized to, amongst other things, manage resources, including, without limitation, ensuring that the appropriate amount of inventory and resources are available when and where they are needed. An execution plan may be generated based on the demand shown in the sales forecast. An execution plan typically specifies the movement and placement of inventory and resources, and includes a plurality of actions that need to be taken to maintain inventory at a certain level.

In the prior art, planning engines are run in a batch mode in which all of the information relating to the value chain network is provided to the planning engine. Based on this input, planning engines known in the prior art generate a plan or model which takes significant computer resources. For instance, a typical execution plan may take 8 to 10 hours or possibly longer depending on the amount of information to be processed. Notably, the planning engines are run, and the generated plan is generated, prior to and separate from the execution stage. The information that is fed into the planning engines known in the prior art is at least in theory the then-current information or state when the planning engine was run. However, in reality, given the multiple systems involved there is no guarantee that the most current information is even incorporated into the planning engine. Because the planning engines known in the prior art created a plan for everything before the execution, the plan necessarily included significant time padding. For instance, there are numerous unknowns at the planning stage when the plan is first created and therefore execution plans known in the prior art included time padding for these unknowns. Further, value networks include multiple companies and each company may include multiple divisions and systems. Execution in the prior art typically deviated from plans rendering the plans moot. Any attempts to work around such deviation in the prior art by incorporate time buffers, inventory buffers and the like, would necessarily come at the expense of agility and efficiency and are thus very sub-optimal. Time buffers for each handoff between each company and often between each division and system within a company create huge inefficiencies and unnecessary downtime. It also necessitates additional expenses such as premium freight costs and requirements of additional stock to reduce out-of-stock situations caused by the inefficiencies of the execution plan. As previously noted, planning engines known in the prior art are run prior to and completely separate from the execution stage. The generated execution plan and the related state information would then be input into a different engine or model and everything would be copied over and then sent over to the execution engine.

Additionally, the plan generated by planning engines known in the prior art is an overall plan of the entire value chain network based on the information that was is at least in theory the then-current information or state when the planning engine was run. Further, some changes to the information or state are local in nature and do not require a full re-plan of the overall plan, but rather, a re-plan of only those portions of the value chain network that were necessarily affected by the change. While fully automatic incremental planning can be done, it is unable to incorporate human decision makers into the incremental planning process. There are a variety of reasons why incorporating human decision makers into the real-time incremental planning process is very advantageous. Some of these reasons are that human decision makers can bring to bear knowledge that is not encoded or hard to encode into automated algorithms. Human decision makers may be required for approvals. There may be collaboration involved and human decision makers can also choose to relax constraints and modify objectives on the fly based on their insights.

As described above, value chain systems known in prior art resulted in significant inefficiencies and redundant network traffic and computer execution. Thus, there currently exist deficiencies associated with enterprise value chain networks, and, in particular, with providing intelligent prescriptive analytics.

SUMMARY OF THE INVENTION

Accordingly, one aspect of the present invention is to provide a system for providing prescriptive analytics. The system includes (i) a plurality of remote computers in communication with a respective plurality of remote users, (ii) a service provider computer having a computer program stored in non-transient memory and one or more microprocessors, (iii) a network interface in communication with the central server and the plurality of remote computers over a shared network, (iv) a shared database in communication with the service provider computer. The plurality of remote computers have shared access to a shared database on the service provider computer over the shared network. The service provider computer is configured to: (I) determine a state of the system, (II) receive an update to the state of the system, (III) upon receipt of the update to the state of the system, determine a potential prescription; and (IV) determine if the potential prescription, were it to be executed, is within a predefined prescription value threshold.

The state of the system includes a current prescription list for a given user context. The service provider is further configured to compare the current prescription list for the given user context with the potential prescription list for the given user context to determine which prescriptions to add, which to modify and which to recall based on differences between the current prescription list for the given user context and the potential prescription list for the given user context, and perform the added, modified and recalled prescriptions in the given user context. If the prescriptive outcome is within the predefined prescription value threshold, present the prescription to the user as a potential prescription in a particular user context. Previously presented prescriptions are also deleted or withdrawn from the user in the appropriate user context if they are no longer valid. The simulated prescriptive outcome determination includes creating a simulation via a network scratchpad, determining one or more potential simulation prescription outcomes within the network scratchpad, determine a potential prescription based on the one or more potential simulation prescription outcomes, and removing the network scratchpad. If the prescriptive outcome is within the predefined prescription value threshold, add the prescription to the potential prescription list for a given user context.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein:

FIGS. 1A-1F are block diagrams illustrating a system providing intelligent prescriptive analytics in accordance with an embodiment of the present invention;

FIGS. 2A-2F are database schemas for providing intelligent prescriptive analytics in accordance with an embodiment of the present invention;

DETAILED DESCRIPTION OF THE PREFERRED EMBODIMENTS

Figure 1C:
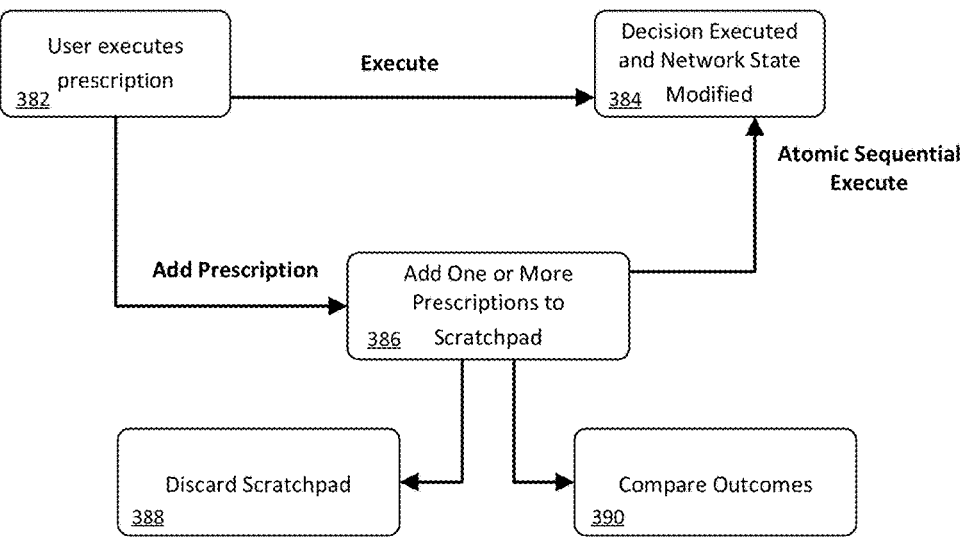

Referring now to the drawings, wherein like reference numerals designate identical or corresponding parts throughout the several views, preferred embodiments of the present invention are described.

As systems in many industries and fields increasingly becoming more complex, the options and decisions available to optimally manage these industries and fields has also become more complex. The data collected relating to the operation of such industries and fields requires some level of data analysis, human interpretation or a combination thereof to be useful. The present invention relates to systems and methods for merging machine learning and human decision making using intelligent prescriptive analytics.

According to the present invention, intelligent prescriptive analytics recommends actions to benefit from the predictions and the implications of each potential action. It not only anticipates what will happen and when it will happen, but also why it will happen. It recommends options to take advantage of a future opportunity or mitigate a future risk and shows the implication of each option. The present invention monitors the state of the complex system in real-time and automatically responds to changes in the state of the complex system in real-time. Such response includes without limitation the present invention automatically proposing recommendations to a decision maker and/or executing a predefined robot on behalf of, or in conjunction with, a decision maker whenever there is a change in state.

The present invention continually refines its proposals by taking in new real-time data to re-predict and re-prescribe, thus automatically improving prediction accuracy and prescribing better decision options. The data includes without limitation changes in the state of the complex system and previous decisions made by the decision maker for similar changes in such state. The present invention may incorporate hybrid data, a combination of structured (numbers, categories) and unstructured data (videos, images, sounds, texts), and business rules to predict what lies ahead and to prescribe how to take advantage of this predicted future without compromising other priorities.

The present invention may be utilized in numerous complex industries and fields including healthcare, supply chain management, financial markets, stock markets, energy industries and the like. For instance, intelligent prescriptive analytics may be utilized without limitation in the healthcare industry. It may be used to improve the effectiveness of clinical care delivery patients and simultaneously achieve better patient satisfaction and retention. Further, it may be used to identify optimal risk intervention models. It may also be used to leverage operational and usage data combined with data of external data such as economic data, population demographic trends and population health trends, to more accurately plan for future capital investments such as new facilities and equipment utilization as well as understand the trade-offs between adding additional beds and expanding an existing facility versus building a new one. The present invention may also be used to expedite drug development by identifying patients most suitable for the clinical trials worldwide and not likely to drop out of the trial due to complications. It may also be used to anticipate the amount of time and money that can be saved.

According to the present invention, prescriptive analytics provide optimal action recommendations to achieve defined objectives including, without limitation, cost savings, satisfaction, profits and cost savings. Prescriptive analytics are used to solve complex decisions with potentially thousands or more decision variables, constraints and tradeoffs. Prescriptive analytics are used in a wide range of use cases spanning strategic planning, operational and tactical activities.

As used herein, intelligent prescriptive analytics is intelligent, timely, executable, contextual, recallable, parallelizable and transparent. It combines machine learning with human interactions to provide the decision maker a choice, and the ability to provide input, approve and collaborate human decisions with the intelligent prescriptive analytics. Said another way, it melds man and machine in providing optimal intelligent prescriptive analytics superior to that which can be achieved by either man or machine alone.

The novel features of the present invention include without limitation: (i) fully executable smart prescriptions; (ii) the recall and re-generation of these smart prescriptions as conditions change in real-time; (iii) execution of smart prescriptions in a dynamic sequence; (iv) a configurable intelligent Robotic Process Automation (RPA) Robot that executes sets of dynamic sequences, (v) support for partially executable smart prescriptions in situations where a fully executable smart prescription cannot be fully generated; (vi) automatic precomputation of the potential impact of a smart prescription based on real-time information if it were to be executed; (vii) the ability to learn what smart prescriptions users execute in a given context and then raising the probability of presenting those smart prescriptions to the decision maker as well as increasing their priority or making them the default smart prescription; (viii) the ability for the decision maker to execute sequences of these in a user scratchpad, see the cumulative impact and then commit all or discard those sequences; and (ix) determining which prescriptions to show the user in every user context by using a combination of the user context and overall system state. The default smart prescription in a context is important in the Intelligent RPA case as it iteratively selects the default prescription until there are no more prescriptions to execute.

According to one embodiment, the present invention provides without limitation fully executable and partially executable smart prescriptions. Both the fully executable and partially executable smart prescriptions may be automatically generated by the system based on for instance a change in network state and at least be automatically proposed to a user. A fully executable smart prescription as defined by the present invention is a prescription that can be executed automatically without needing additional information from a user. In order to be a fully executable smart prescription it must send an object that can be executed in a valid form. The system includes a man-machine learning module that is continually learning in a recursive manner such that previous decisions are used to train the system to further refine future recommendations involving similar state conditions. A fully executable smart prescription may be generated based upon these previous decisions to resolve changes in state based on previous user decision options. However, in other cases, the system may need to generate a prescription, but does not have all of the necessary information. In these cases, the system may generate a partial smart prescription and allow the user to provide any additional information required. Importantly, the system is configured to dynamically generate any user interface necessary to get this additional information, which may include without limitation user interfaces which are automated to reduce human interface. Unlike automated RPA systems known in the prior art, the user interface varies and depends on the type and degree of information required to be provided by the user. The system scans the network for any changes that may occur in real-time.

The smart prescription and any user interfaces generated may be based on meta information relating to the current state, changes to the state of the system and/or previous user decisions options learned over time by the man-machine learning module. The man-machine learning module is configured to learn what smart prescriptions users execute in a given context. Previous decision options are reflected in the probability of presenting a particular smart prescription to the decision maker as well as increasing their priority or making them the default smart prescription.

Smart prescriptions may be recalled and re-generated as conditions change in real-time. According to this embodiment, other executed prescriptions and/or any changes that may occur in real-time to the system, which is continuously monitored by the present invention, may result in a previously generated smart prescription no longer being optimal and/or preferred. In such conditions, these smart prescriptions may be recalled (or said another way undone) and/or regenerated with modifications to provide a more desirable outcome.

According to an embodiment of the present invention, when a smart prescription is initially generated or re-generated, a decision maker is not only provided with a recommended prescription, but also what potential impact the recommended prescription would have on the system. For instance, the potential impact may be presented to the user such that if the user executes a particular smart prescription, then there would be an estimated savings or benefit to the user (e.g., $1000 in savings may be achieved by executing the prescription). The potential impact of a smart prescription if it was executed is automatically precomputed using real-time information, including without limitation the real-time network state 356, any real-time network state changes 358 and any user state not reflected on the network 354 as shown in FIG. 1B. The system continually scans the system and takes the whole network state into consideration as to what would happen and in estimating the savings or benefit provided to the user. This may require the comparison of thousands of variables in real-time. These smart prescriptions may be automatically generated and/or recalled and re-generated based on changes in state of the network. The execution of a prescription may in result in unintended consequences such as ripple effect that causes other portions of the network to need additional prescriptions by this user or potentially other users. Because of this, the trigger of such automated generation may be based on pre-configured thresholds configured by the user or provided by the system to minimize the impact of the execution of the prescription with respect to the entire network and each of its users. The threshold may be provided to reduce any potential ripple effect that may occur throughout the network by executing the smart prescription.

According to one embodiment, the execution of smart prescriptions may be arranged in a dynamic sequence. For example, prescriptions A, B and C could be arranged to be executed collectively and in sequence. The dynamic sequence of prescriptions is stored in the database. However, changes to the network state may result in the system not being able to execute the dynamic sequence. Further, the execution of a smart prescription may result in another smart prescription being recalled and modified. For example, prescription A may cause prescription B to be recalled and prescription C to be modified. The present invention continuous scans for such situations and automatically proposes and/or modifies the dynamic sequence of prescriptions such that optimal conditions are at least in theory always maintained. As such, the dynamic sequence may be automatically or manually modified such that it includes prescription A and modified prescription C and excludes prescription B. The dynamic sequence may also be simulated in a user scratchpad 364. Using a user scratchpad 364, a decision maker may execute such sequences in the user scratchpad, see the cumulative impact of the execution of all of the sequences and then commit all or discard those sequences.

According to an embodiment of the present invention, as discussed herein, the system may automatically present a list of potential smart prescriptions to the user. In order to help the user in selecting the optimal decision option, the system automatically determines which prescriptions are shown to the user in every user context by using a combination of the user context and overall system state. The default smart prescription in a context is important in the Intelligent RPA case as it iteratively selects the default prescription until there are no more prescriptions to execute.

Intelligent Prescriptive Analytics System

Referring to FIGS. 1A-1F, block diagrams illustrating a non-limiting exemplary system providing intelligent prescriptive analytics in accordance with an embodiment of the present invention, are shown. According to this non-limiting example, computer systems, databases and computer programs associated with the value chain network are shown.

Figure 4A:
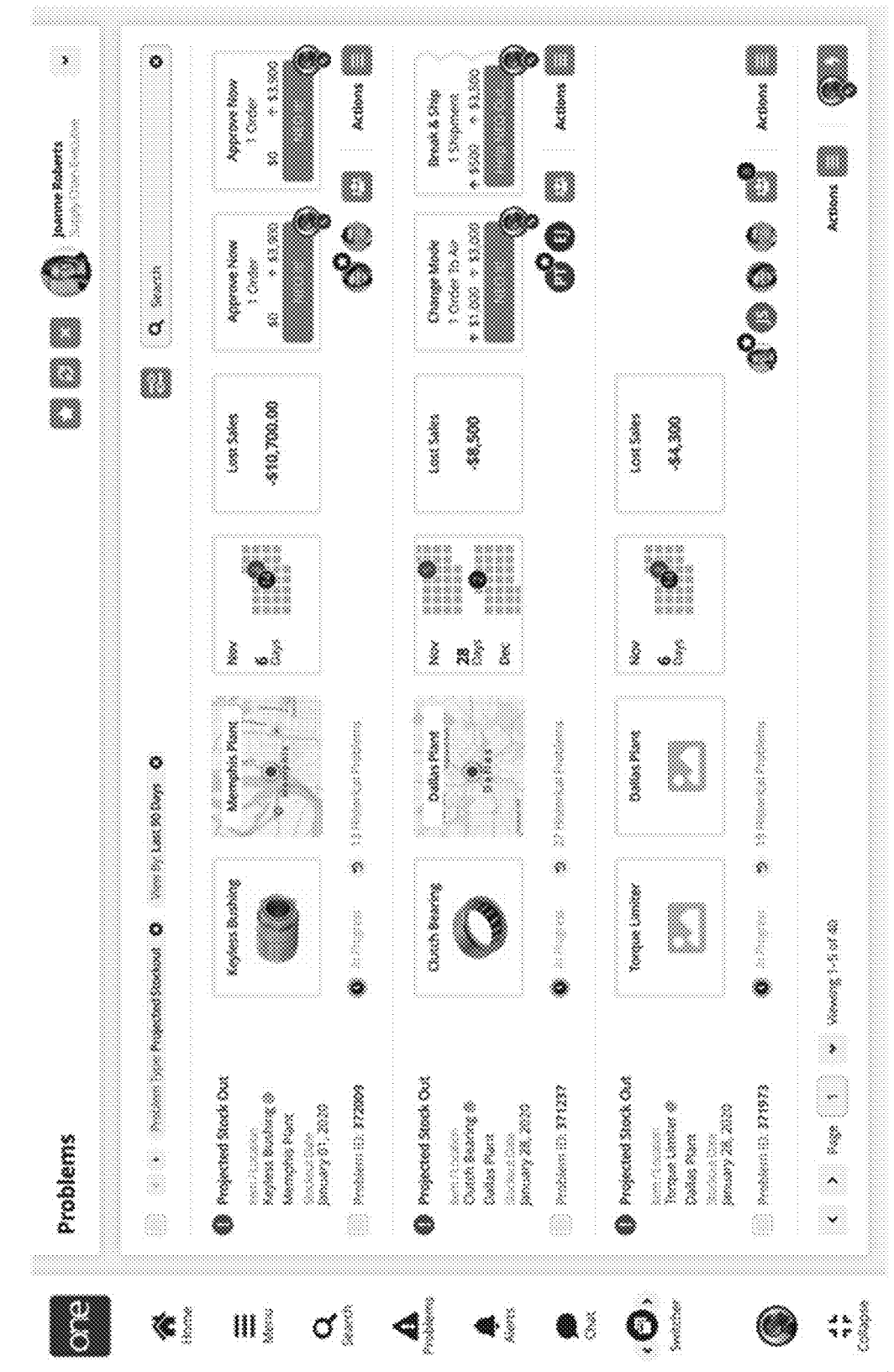
FIGS. 4A-4Z are representative graphical user interfaces for providing intelligent prescriptive analytics in accordance with an embodiment of the present invention.
Figure 4B:
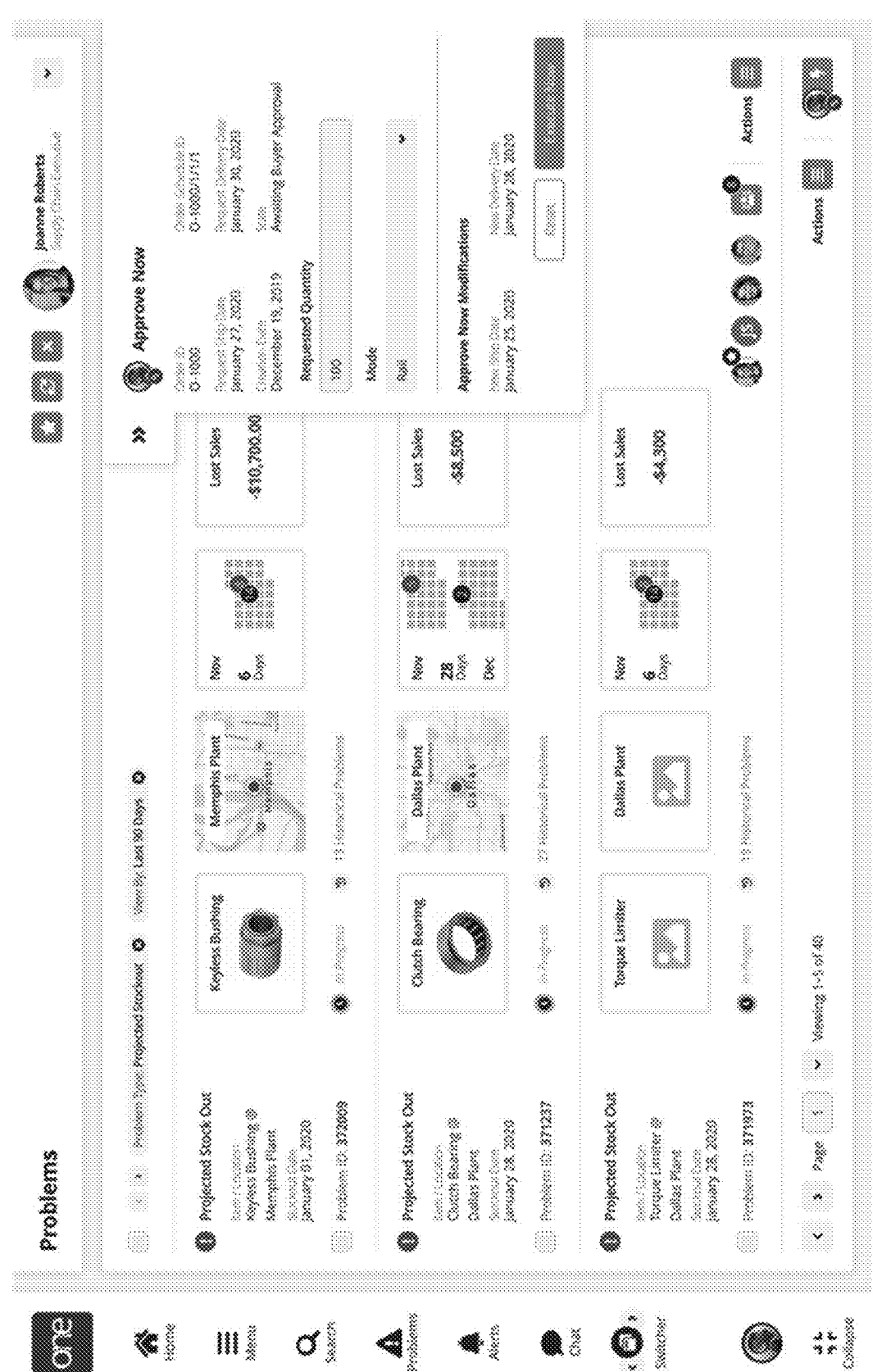
Figure 4C:
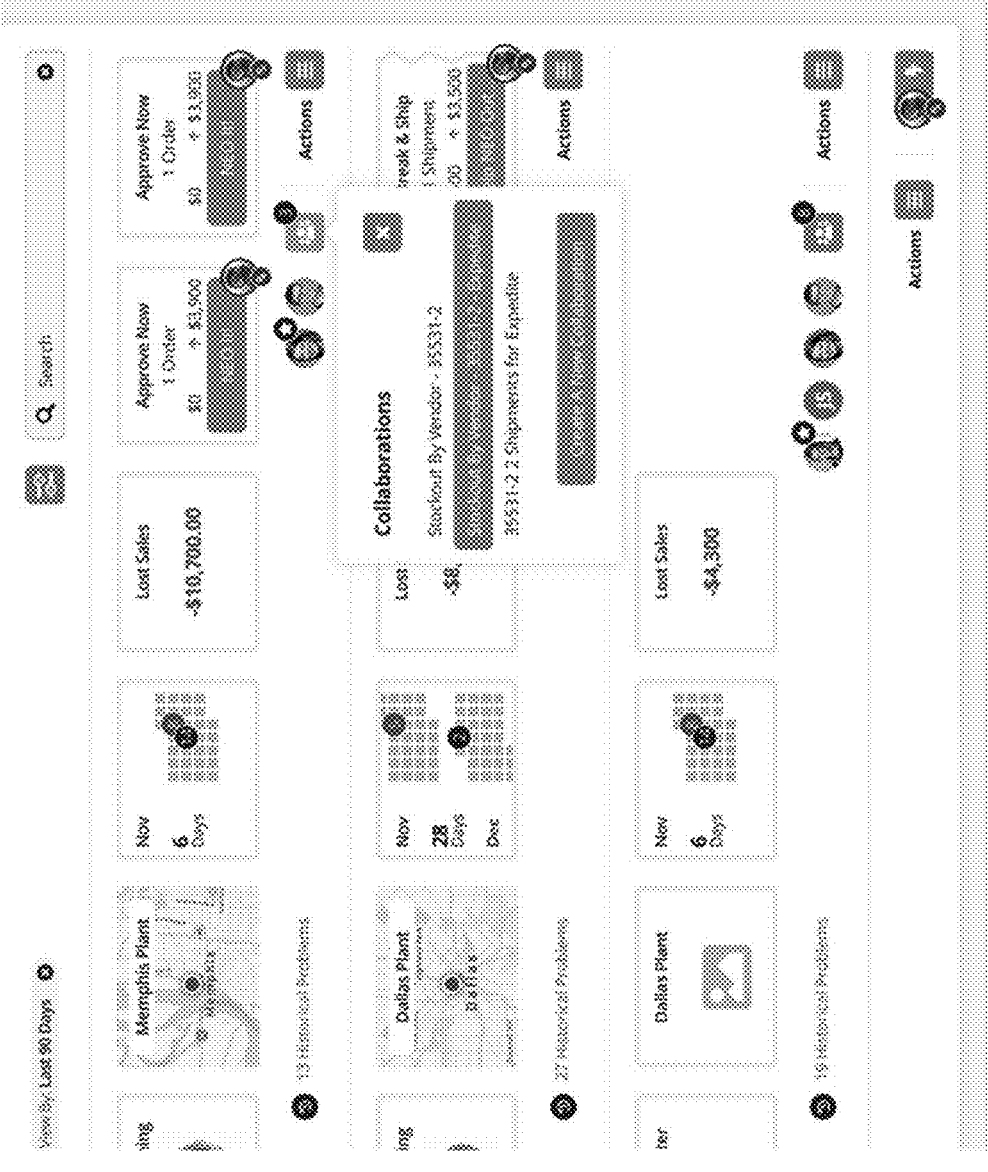
Figure 4D:
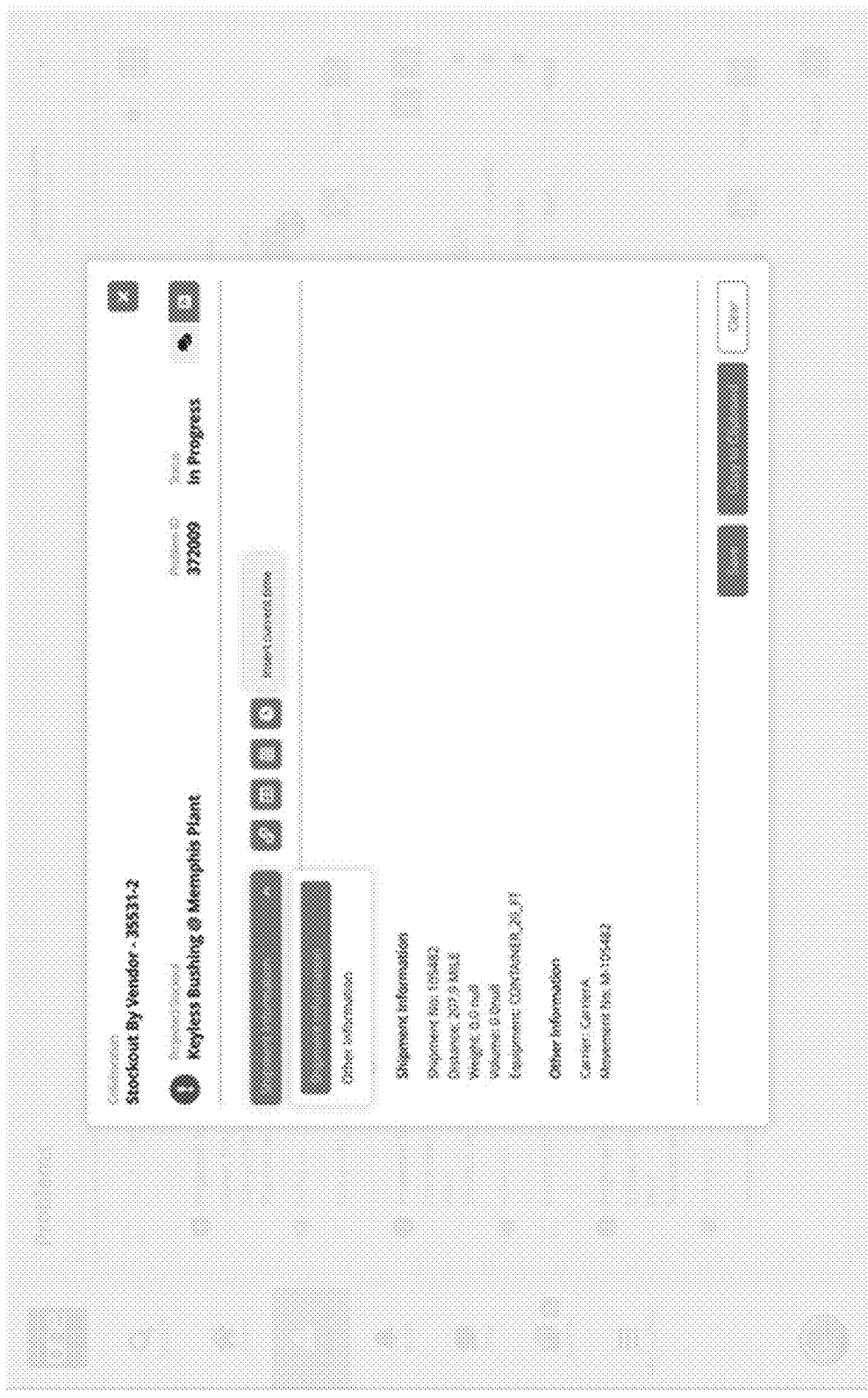
Figure 4E:
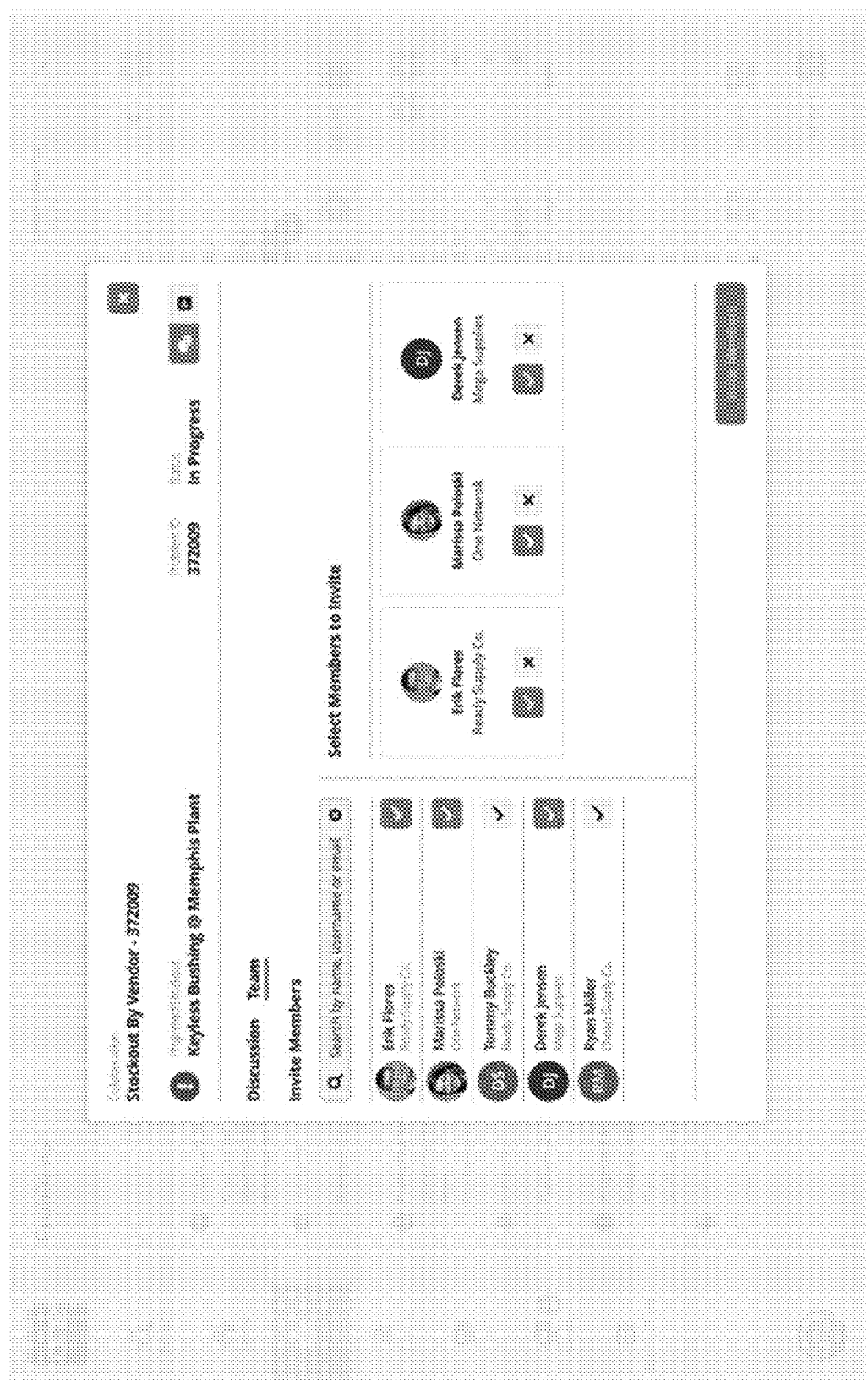
Figure 4F:
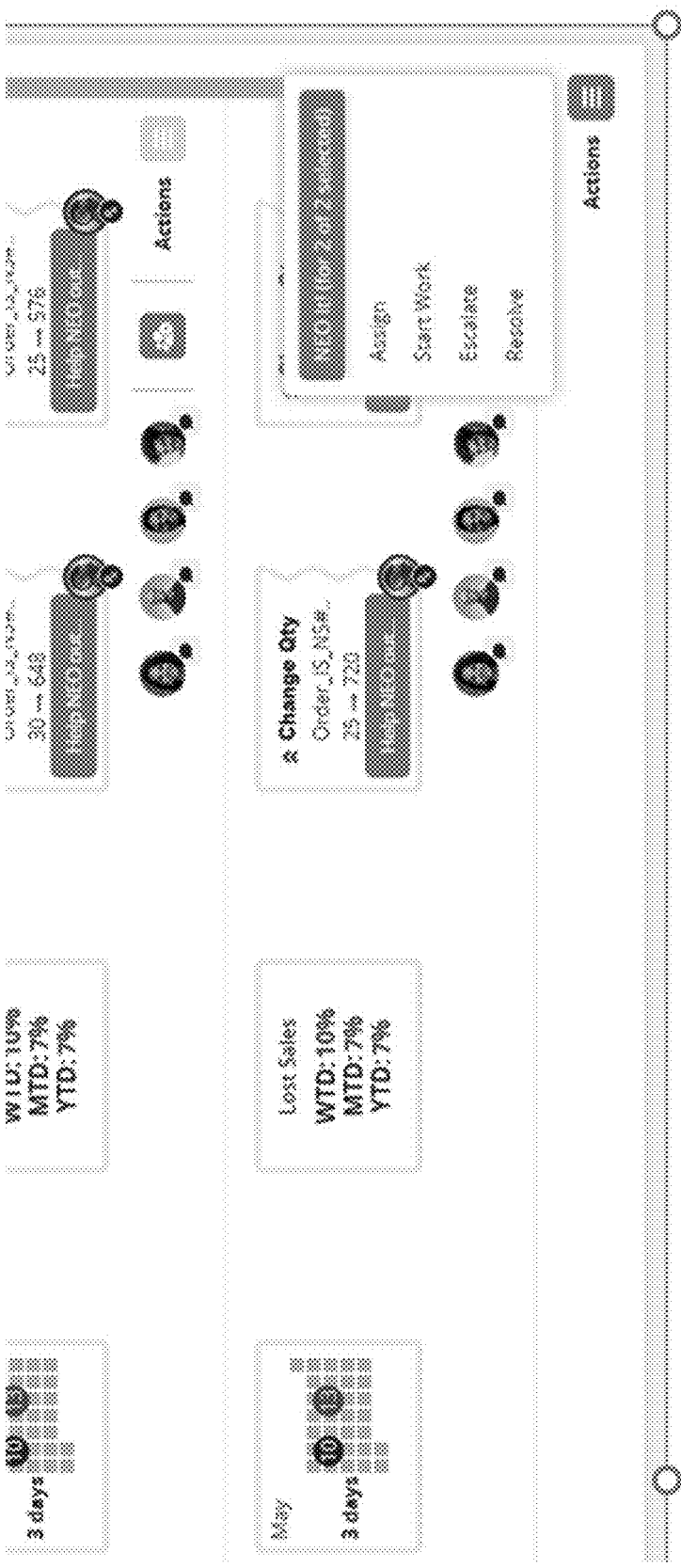
Figure 4G:
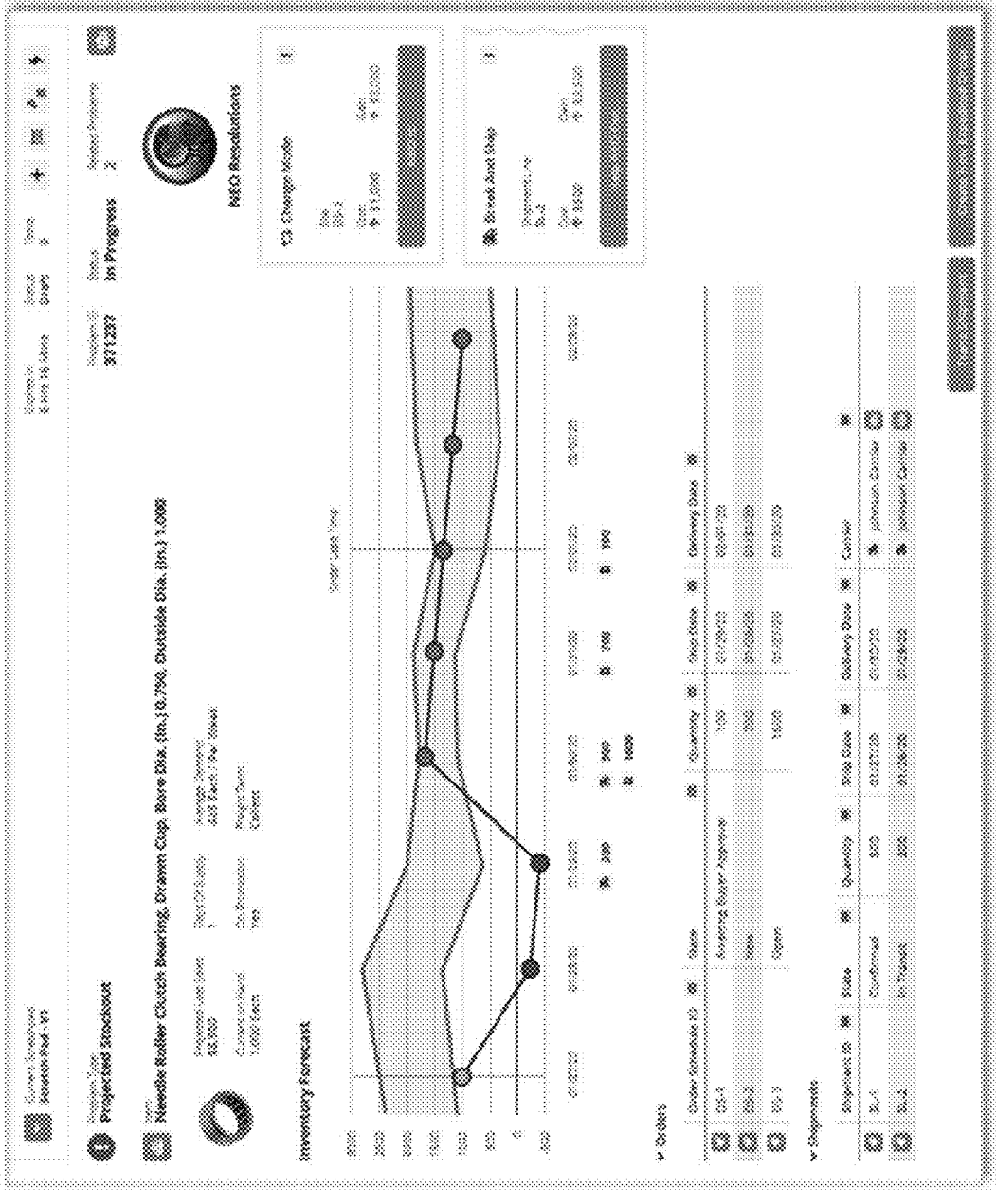
Figure 4H:
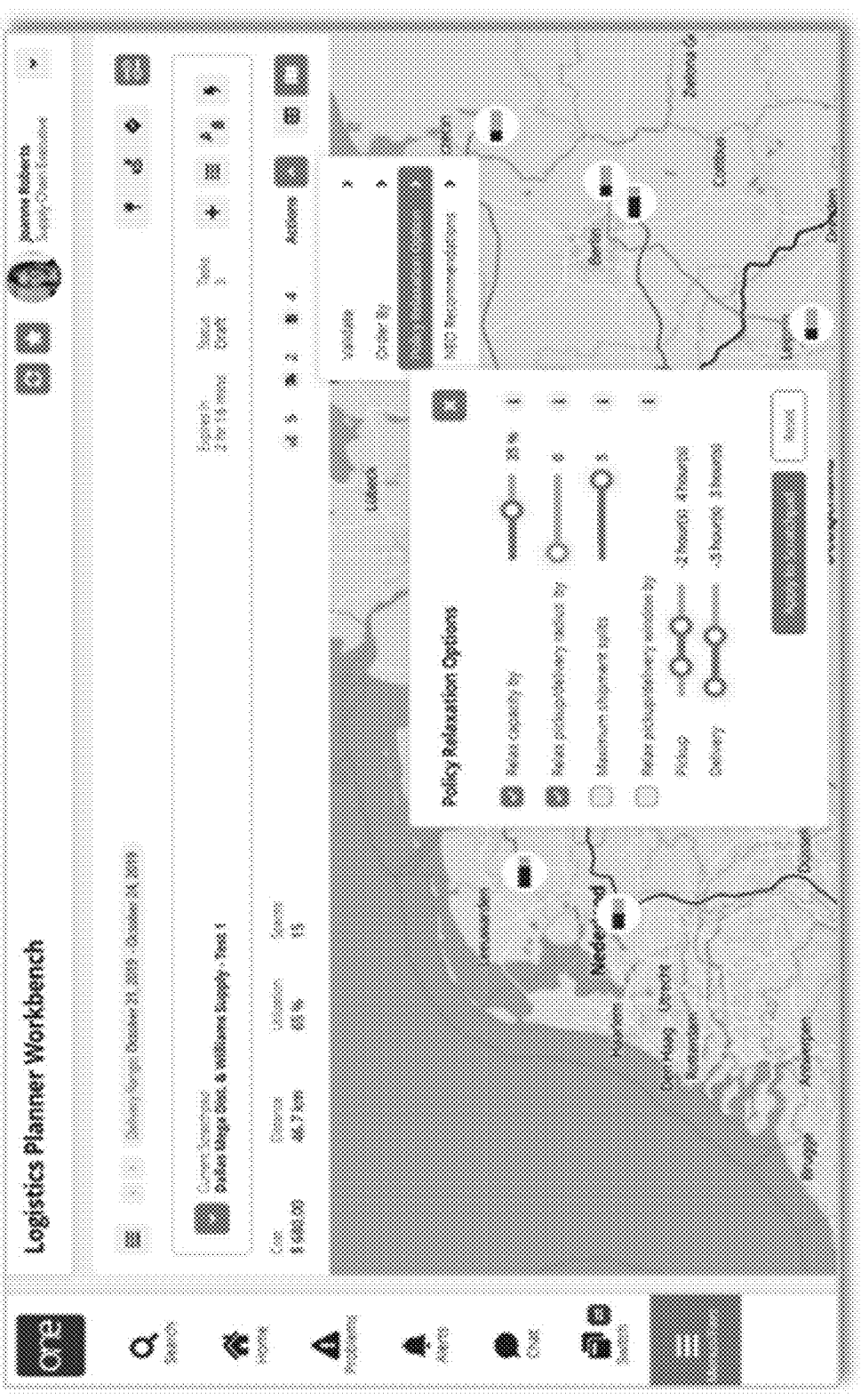
Figure 4I:
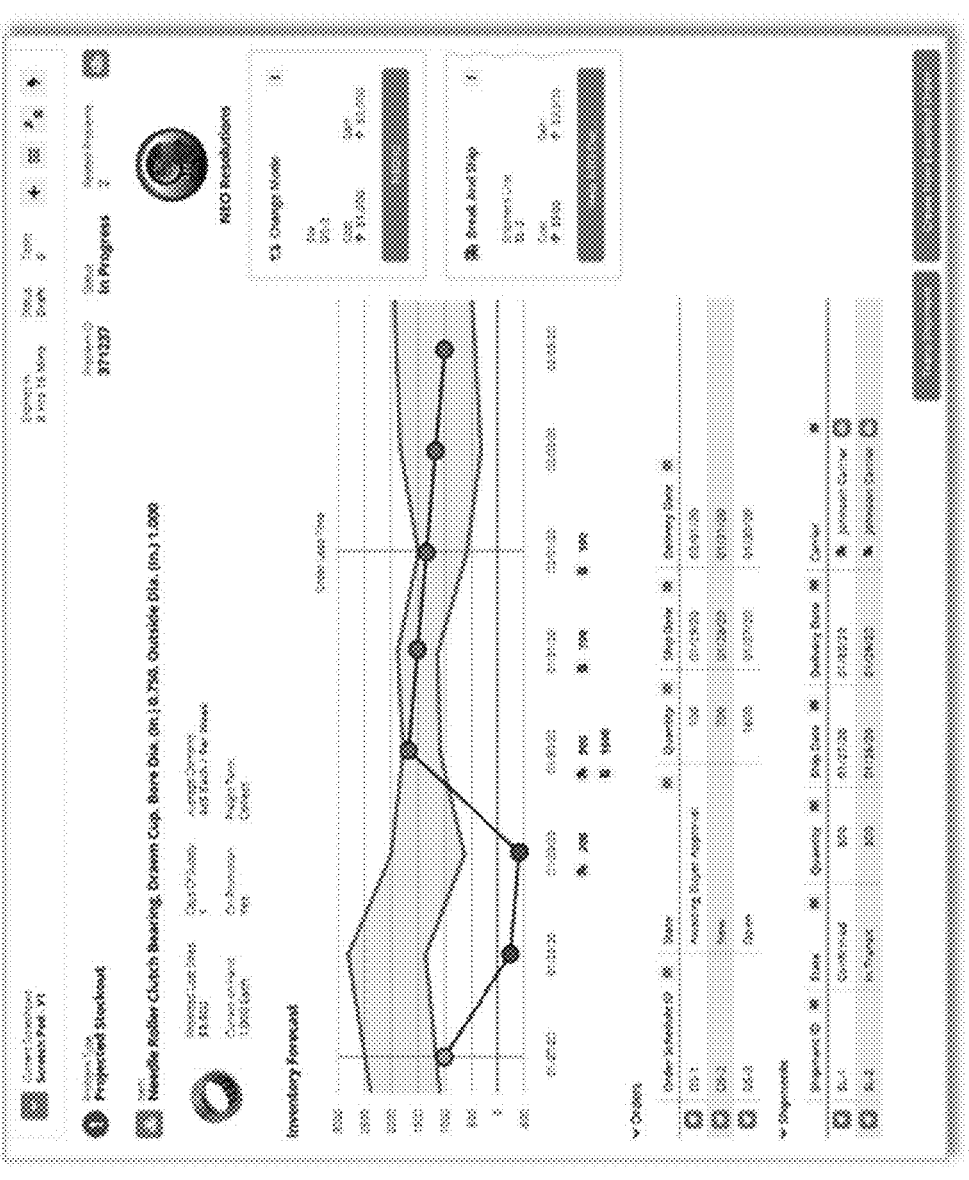
Figure 4J:
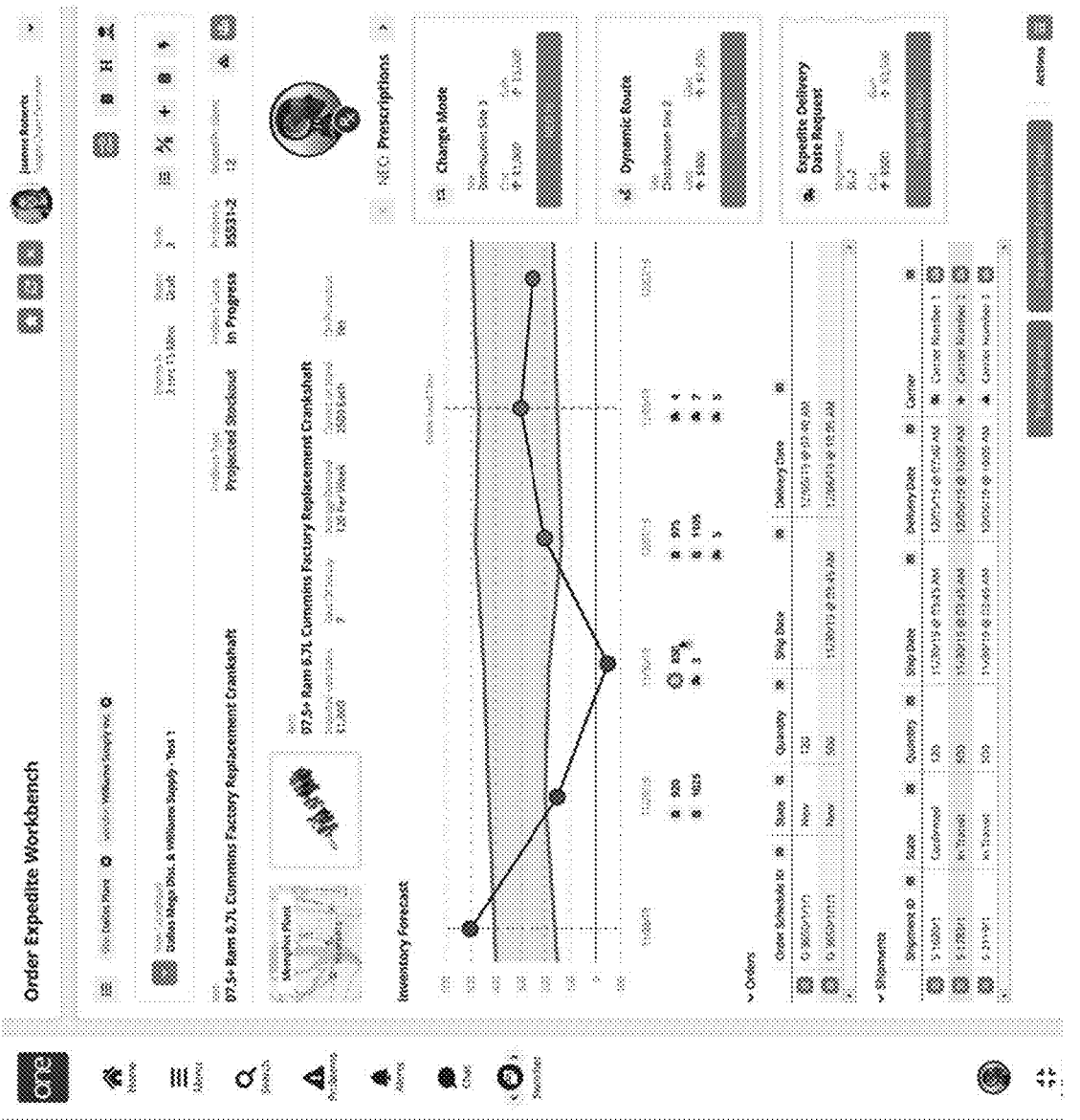
Figure 4K:
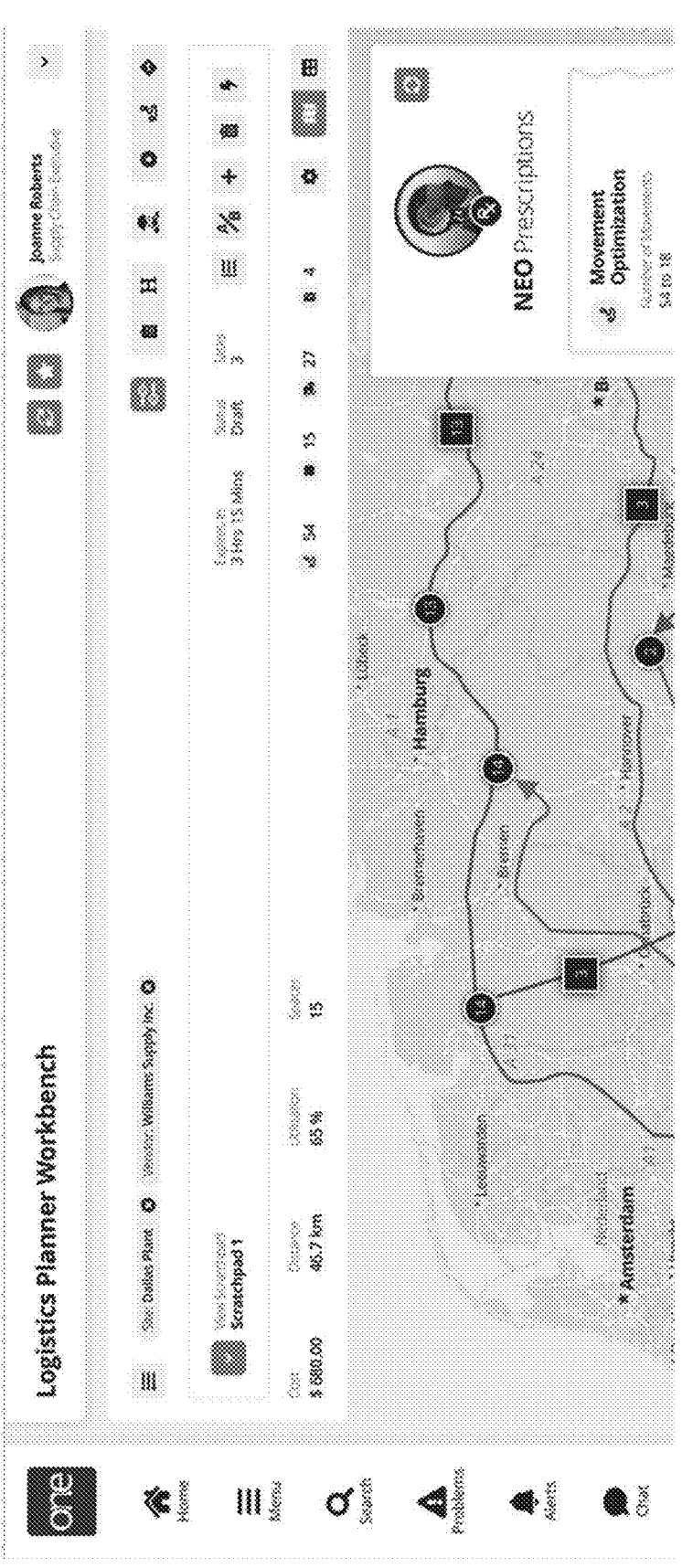
Figure 4L:
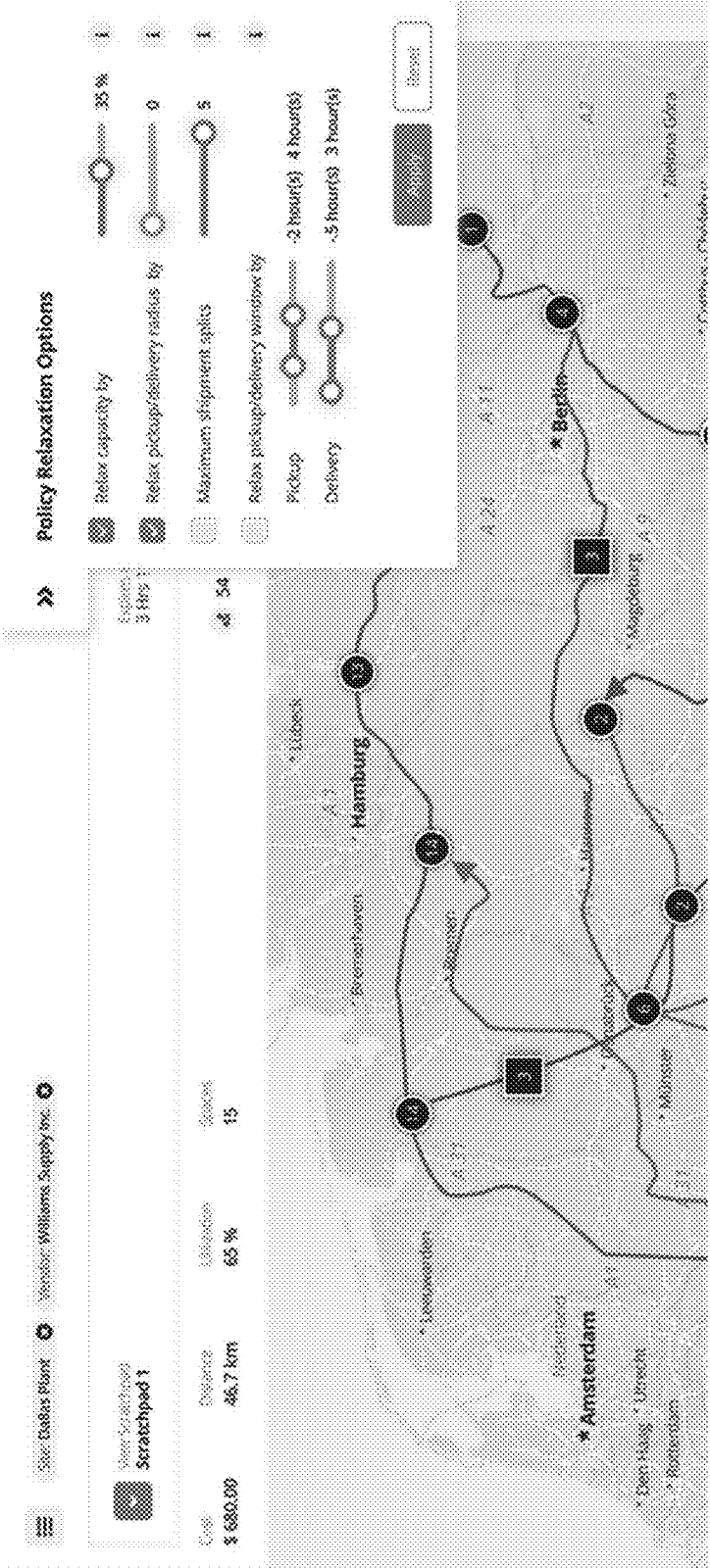
Figure 4M:
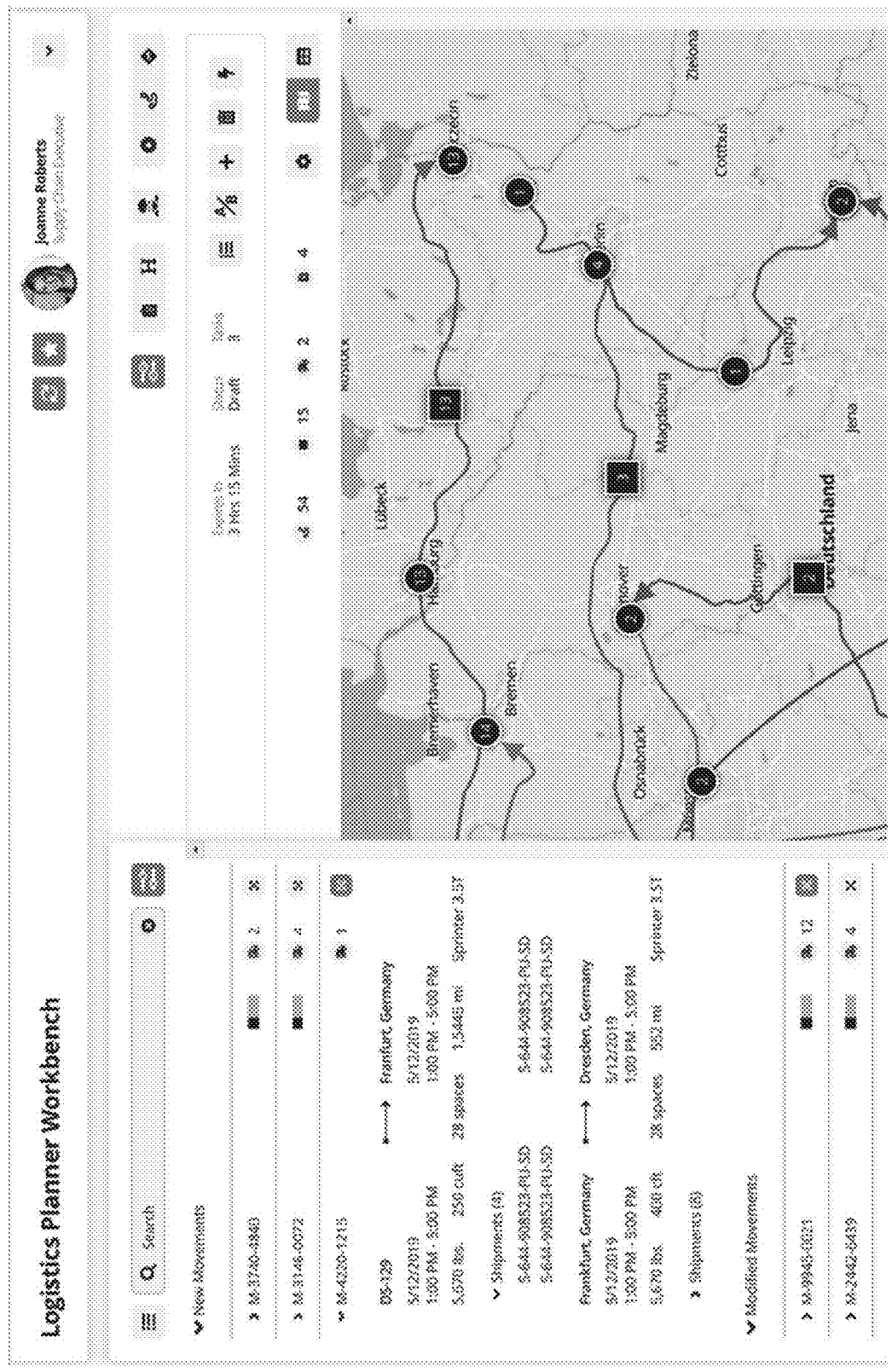
Figure 4N:

As shown in FIG. 1B, according to an embodiment of the present invention, a prescribe analytics engine 360 includes a prescriptive analytics module 262, one or more user scratchpads 364, a Network Scratchpad 366 and a decision options auto execute module 368. The prescriptive analytics engine 360 receives input 350 and produces output 370. Input 350 includes without limitation decision objectives 352, user state not reflected on the network 354, real-time network state 356 and real-time network state changes 358. Output 370 includes without limitation new user prescriptions 372, modified user prescriptions 374 and recalled user prescriptions 376. Each user (also referred to herein as a decision maker) may have its own user state not reflected on the network 354, user scratchpad 364, new user prescriptions 372, modified user prescriptions 374 and recalled user prescriptions 376. A user scratchpad 364 is provided by the present invention and allows a user to test potential prescriptions and see the impact of those potential prescriptions without actually altering the network or its network state. The impact may be numerically, textually or visually represented. For instance, an exemplary non-limiting user interface visually showing the impact of a potential prescription is shown in FIG. 4N. However, it is understood that other visual representations are possible within the scope of the present invention. The user scratchpad 364 is transactional in nature. A database transaction symbolizes a unit of work performed within a database management system against a database, and treated in a coherent and reliable way independent of other transactions. A transaction generally represents any change in a database that may be rolled back to its previous state.

Similar to the user scratchpad 364, a Network Scratchpad 366 is provided by the present invention and allows testing potential prescriptions and see the impact of those potential prescriptions without actually altering the network or its network state. The primary difference between the user scratchpad 364 and the Network Scratchpad 366 is that a user scratchpad 364 is specific to, and controlled by, a user whereas the Network Scratchpad 366 relates to the entire network and is utilized in the background to determine the effect of a proposed prescription were it to be executed even before it is presented to the user. Because the user scratchpad 364 is specific to a particular user, there may exist a different user scratchpad 364 for each user whereas there is only one Network Scratchpad 366, which allows testing potential prescriptions and see the impact of those potential prescriptions across the entire network. However, multiple Network Scratchpads may be spawned by the system to handle additional concurrent throughput.

Figure 1D:
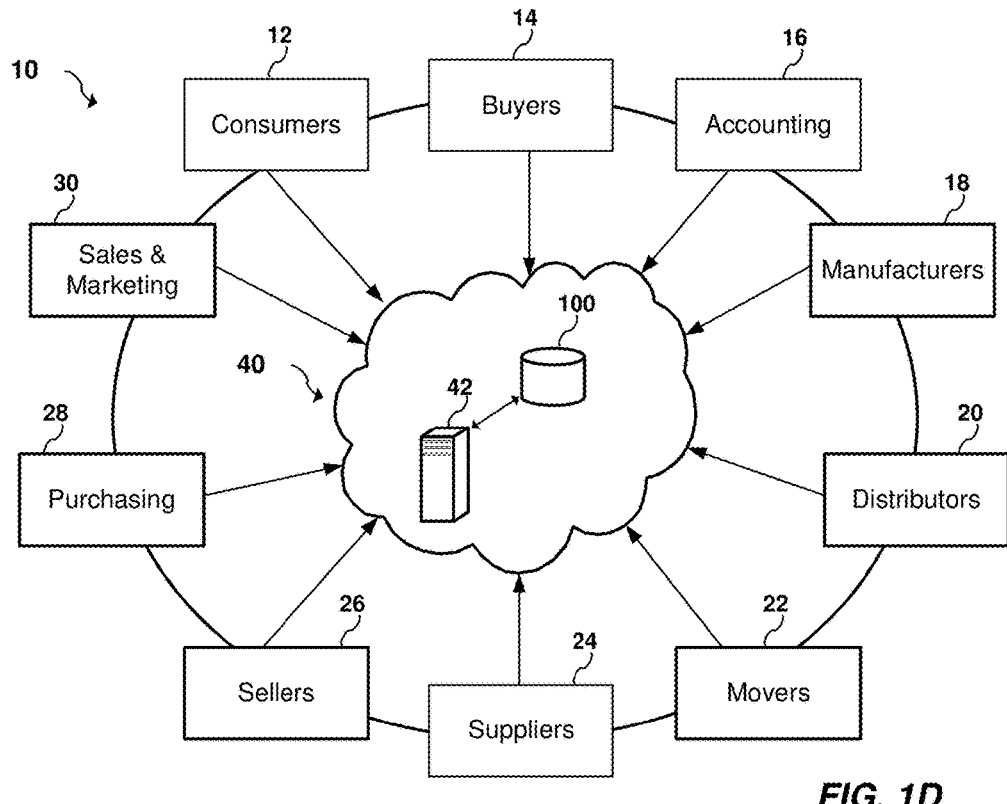
Figure 1E:
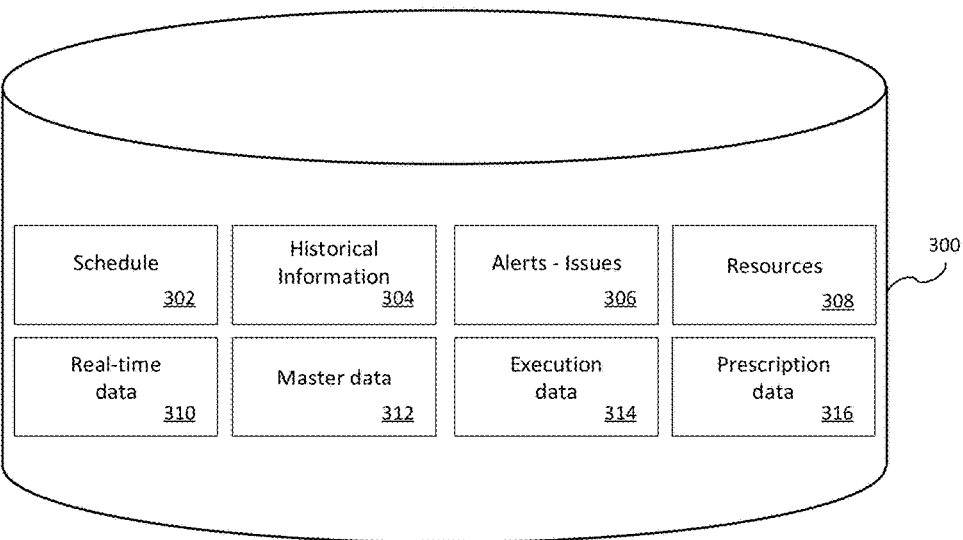
Figure 1F:
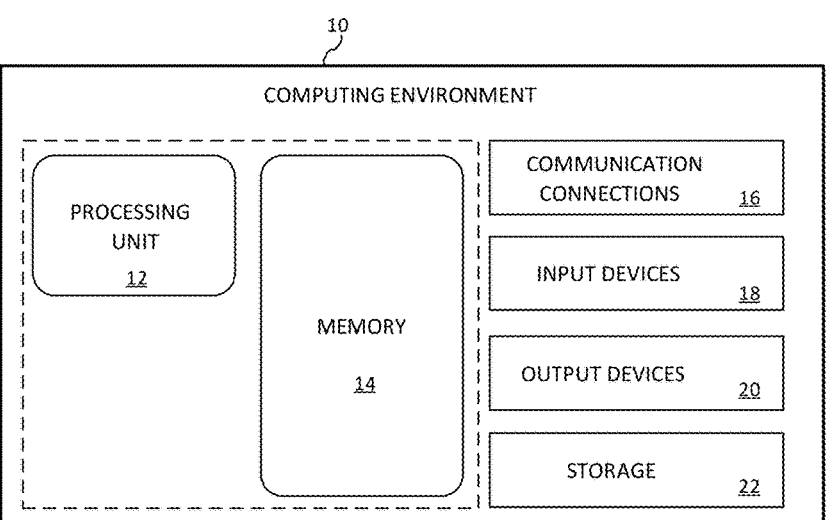

According to one non-limiting embodiment, as shown in FIGS. 1D and 1E, a shared database 100 is maintained by a service provider, such as One Network, in a cloud arrangement. Companies and/or entities typically login to a single server or several tightly coupled servers all under the control of the service provider. The companies and/or entities access the computational resources of the service provider, including, without limitation, shared databases 100, via a computer network, such as the Internet. This type of arrangement is often referred to as "cloud computing" in that substantially all of the computational resources and databases are maintained by the service provider which is represented in FIG. 1D. Using the "cloud computing" arrangement of this embodiment of the present invention, each company and/or entity share a single version of truth (SVOT) with respect to the respective data in the database, because they are maintained in the "cloud" by the same service provider. Each company and/or entity logs-in either directly or indirectly with computers/servers 42 or otherwise is in communication with such. For instance, each company and/or entity logs-in and then utilize, without limitation, the graphical user interface shown in FIGS. 4A-5Z. Alternatively, a company and/or entity may login using a mobile app (not shown). After such log-in or other communication with computers/servers 42, each company and/or entity thereby is provided access to a portion of the shared database 100. The shared database 100. is shared such that although each company and/or entity may have different views of data, as noted above, they all share a single data element having a single version of truth (SVOT) with respect to the data. Each company and/or entity is restricted to the portion of the shared databased 100 by the company's and/or entity's allowed permissibility which may be predefined and/or configurable.

Companies and/or entities may include without limitation, consumers 12, buyers 14, accounting 16, manufacturers 18, distributors 20, movers 22, suppliers 24, sellers 26, purchasers 28, and sales and marking 30. Each company and/or entity logs-in either directly or indirectly with computer/server 42 and connects with a shared database 100. After such log-in or other communication with computer/server 42, each company and/or entity thereby is provided access to information provided in the shared database 100. The shared database 100 may include without limitation, scheduling data 302, historical information data 304, alerts/anomaly data 306, resource data 308, real-time data 310, master data 312, execution data 314 and prescriptive data 316.

The prescriptive data 316 may include without limitation scratch pad data 102, prescription data 104, problem data 106, problem type data 107, problem dimension data 110 and neophyte data 112. Scratch pad data 102 captures a "working area where prescriptions can be applied for "what if" analysis prior to committing the prescriptions to the database or discard if the results are not satisfactory. Prescription data 104 captures a generated prescription which can be used to solve a particular instance of a problem, either automatically or through directed user action. Problem data 106 identifies a "problem" in need of a solution. For example, a "problem" may include without limitation a "potential lost sales at site S1", an "overcharge on invoice I1", a "request or promise mismatch on order O1", and the like. Problem type data 108 identifies a type of problem, such as without limitation, a "potential lost sale", "overcharge", "request or promise mismatch" and the like. For example, without limitation, a projected stockout may include the exemplary problem types shown in table 1 below.

TABLE 1

| Exemplary Projected Stockout Problem Types | |
|---|---|
| Problem Type | Description |
| Approve Now | This will generate for order which are in Awaiting Approval state. Executing it approves the order moving it into New state so the vendor can respond. |
| Change Mode | This will generate for orders which can improve a stock out situation by changing the transportation mode to reduce the lead time of the order. |
| Change Quantity | This will generate for order which can improve a stock out by increasing the quantity on the order. |

TABLE 1-continued

| Exemplary Projected Stockout Problem Types | |
|---|---|
| Problem Type | Description |
| Create New Expedited Order | This prescription will create a new order which is flagged for expedite with a delivery date that can improve a stockout situation. |

Further, a transportation management system (TMS) may include the exemplary problem types shown in table 2 below.

TABLE 2

| Exemplary TMS Problem Types | |
|---|---|
| Problem Type | Description |
| No Carrier Found | If there are no possible carriers available currently on network to be secured for movement, "No Carrier Found" problem will be raised against the movement. As a part of prescriptions, carriers available with least cost and current equipment or compatible equipment of current movement will be shown as options to confirm the carrier for the movement and resolve this problem. |
| Predicted Delivery Arrival Delay | When system detects that the delivery may not be possible based on current ETA or delivery dates, then system raises a "Predicted Delivery Arrival Delay" problem against the shipments. As part of prescriptions, new possible candidates based on current delivery dates or ETA computed recently or given target date will be shown as options for rescheduling the delivery appointments and resolve this problem. |
| Shipment Delays | If the shipment's plan dates are in past or shipment is not picked up or delivered on time then a "Shipment Delays" problem will be raised against the shipment. As part of prescriptions for this problem, new ship and delivery date will be shown as option. Also if there are appointments are already scheduled for shipment, then option of rescheduling those appointments will be also shown. |

Problem dimension data 110 identifies a "dimension" affected by the problem, such as without limitation, a site where the problem occurred, an item from a product catalog which is affected, and the like. Neophyte data 112 couples problem search criteria with a schedule. For example, without limitation, a problem search of "find all potential lost sales problems for sites S1 and S2" might be coupled with a schedule of nightly at 12 AM.

Processing Flows

Referring to FIGS. 1C and 3A-3D, flow charts illustrating a method for providing intelligent prescriptive analytics in accordance with an embodiment of the present invention. As shown in FIG. 1C, a user initiates the execution of a smart prescription at block 382. At block 384, the smart prescription is executed and the network state is modified. Alternatively, beginning at block 386, a user scratchpad may be utilized. One or more prescriptions are added to the user scratchpad. A user may compare the outcomes at block 390 or discard the scratchpad data at block 388.

Figure 3A:
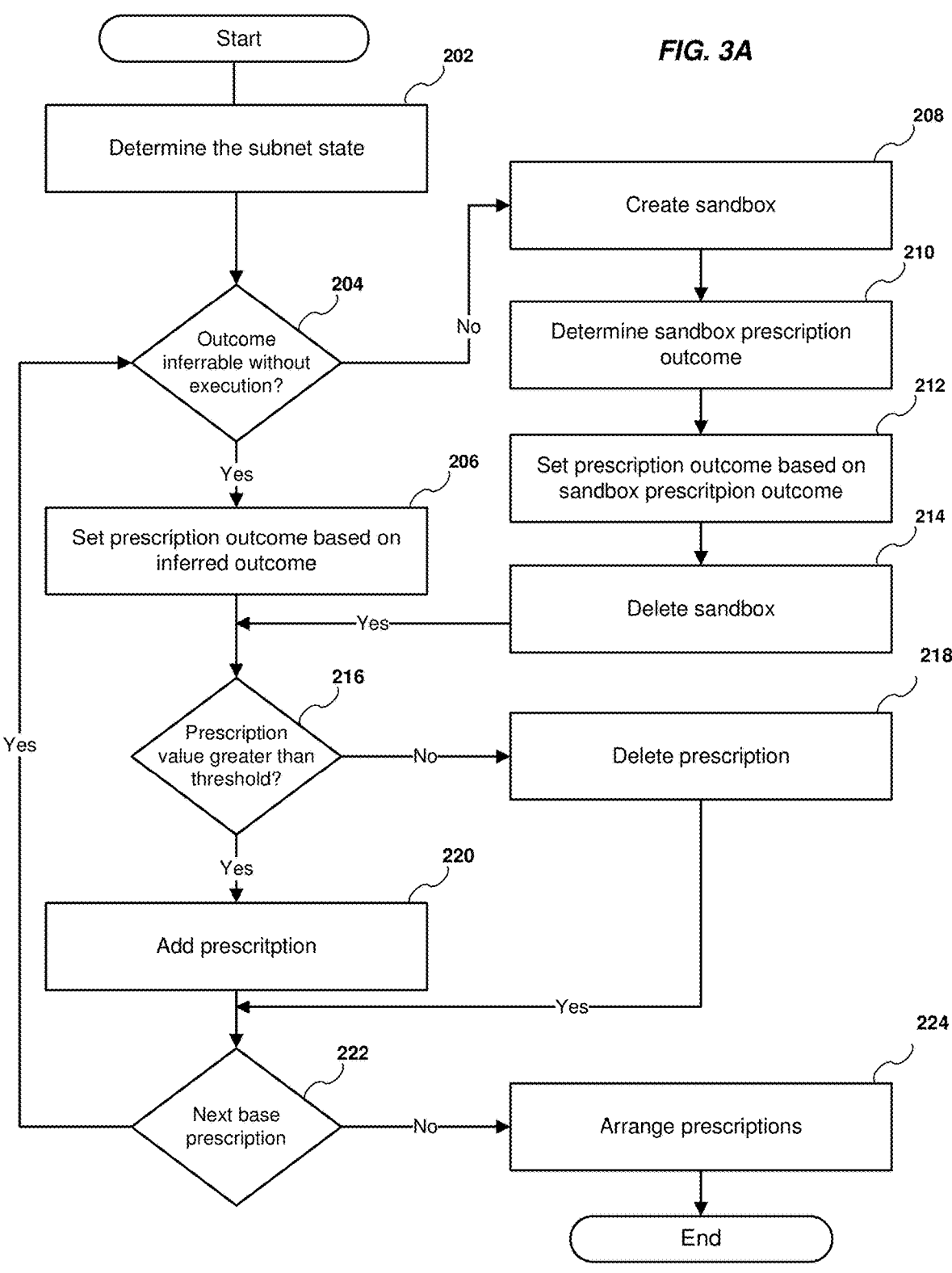
FIGS. 3A-3D are flow charts illustrating a method for providing intelligent prescriptive analytics in accordance with an embodiment of the present invention.
Figure 3B:
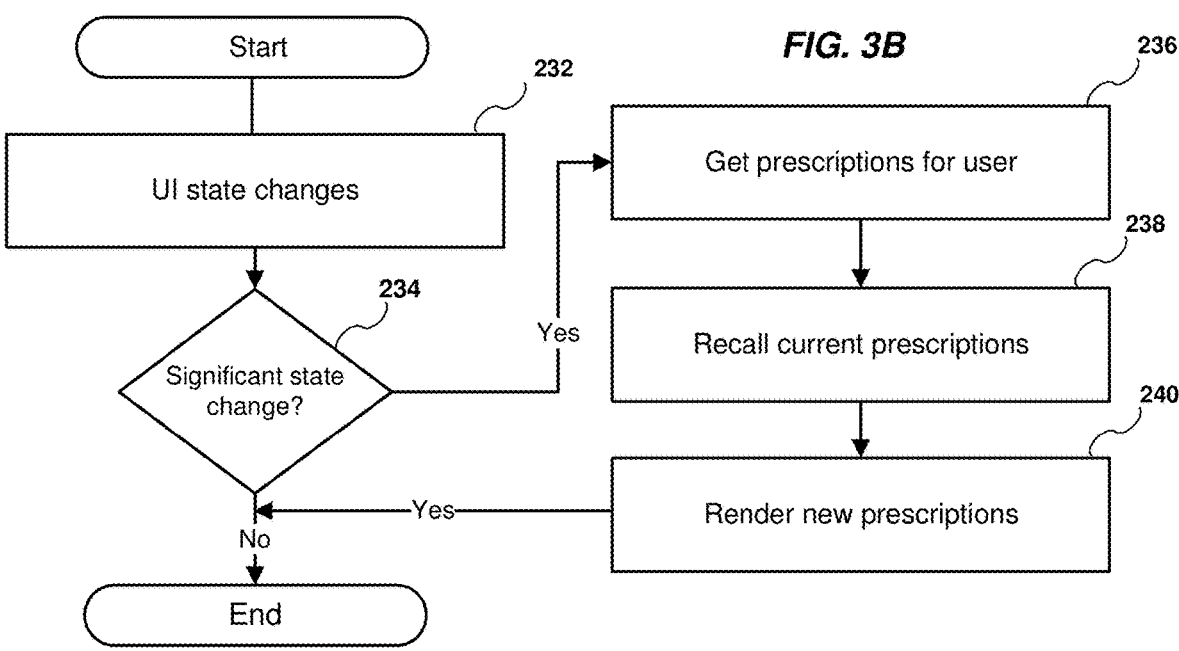
Figure 3C:
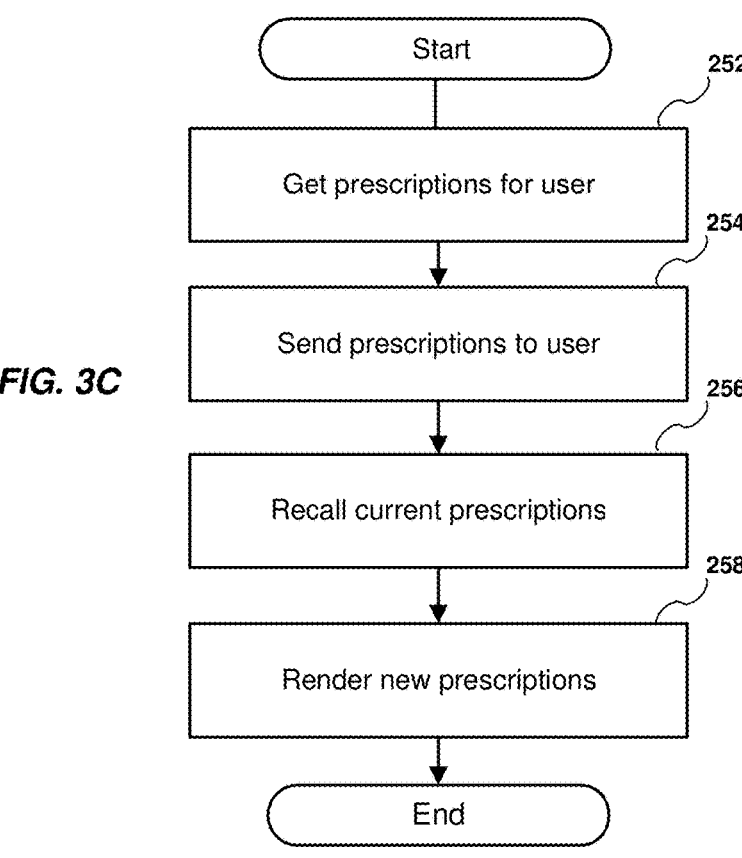
Figure 3D:
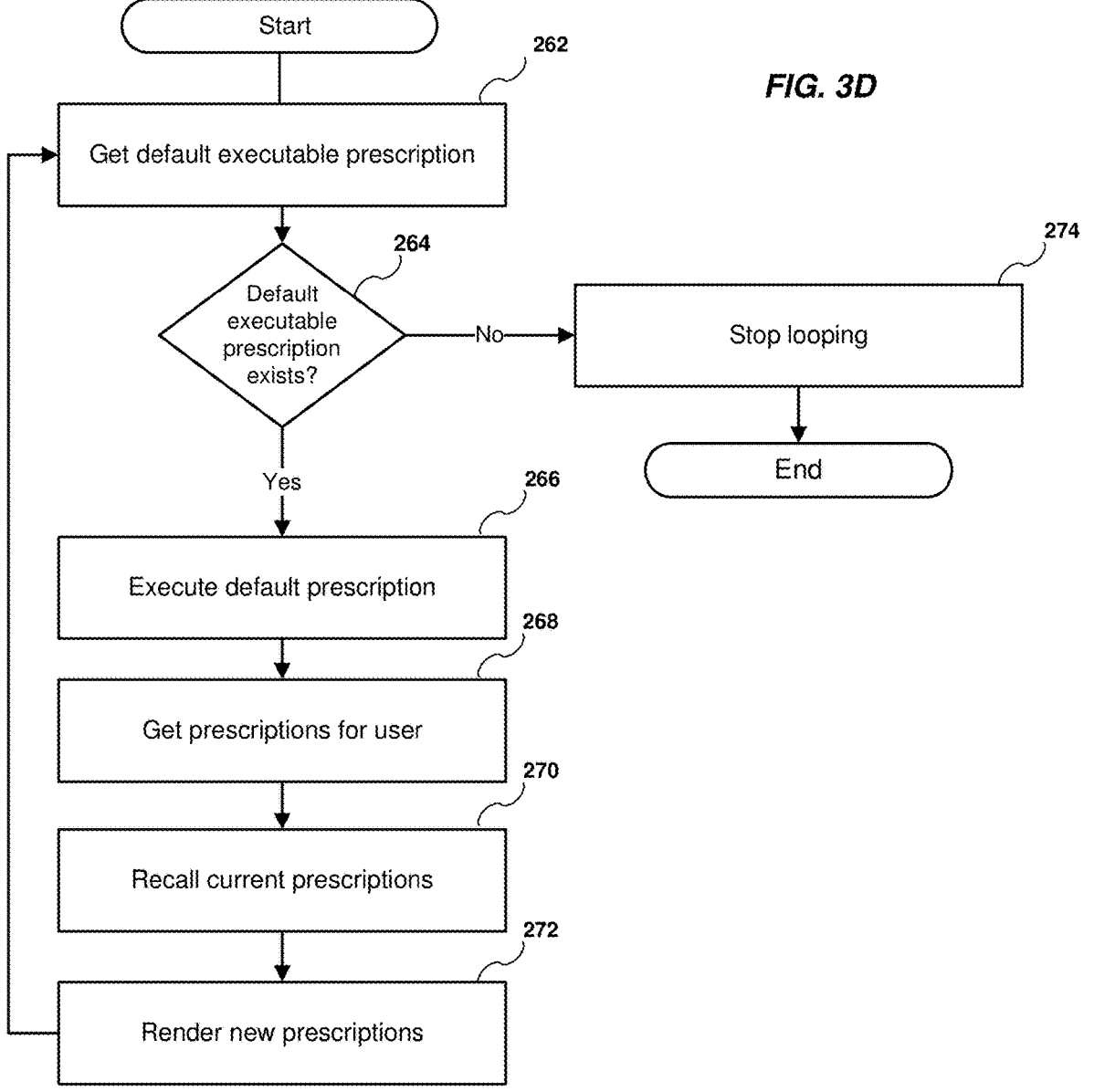

As shown in FIG. 3A, for each base prescription the subnet state is determined, at block 202. A determination of whether the outcome is inferable without execution is made at block 204. If the outcome is inferable, then at block 206, the prescription outcome is set based on the inferred outcome. If the outcome is not inferable, then a user scratchpad is created and a sandbox prescription is determined, at blocks 208 and 210. At block 212, the prescription outcome is set based on the sandbox prescription outcome. The user scratchpad is then deleted at block 214. At block 216, a determination of whether the proposed prescription is greater than a predetermined threshold value. If the proposed prescription is greater than a predetermined threshold value, then proposed prescription is deleted at block 218. At block 220, if the proposed prescription is not greater than a predetermined threshold value, then the prescription is added. A determination of whether there are any remaining base prescription, at block 222. If there are remaining base prescriptions, then processing continues at block 204 for the next base prescription. If there are no remaining base prescriptions, then the prescriptions are arranged, at block 224.

As shown in FIG. 2B, a user interface state changes at block 232. At block 234, a determination of whether the state change is significant is made. If the state change is significant, then prescriptions the user are determined at block 236. At block 238, current prescriptions are recalled. The new prescriptions are rendered at block 240.

As shown in FIG. 2C, the prescriptions for the user are determined at block 252. At block 254, the prescriptions are sent to the user. At block 256, current prescriptions are recalled. The new prescriptions are rendered at block 258.

As shown in FIG. 2D, the default executable prescription is determined at block 262. At block 264, a determination of whether a default executable prescription exists. If a default executable prescription does not exist, then looping stops at block 274. At block 266, if a default executable prescription exists, then the default prescription is executed. The prescriptions for the user are determined at block 268. At block 270, current prescriptions are recalled. The new prescriptions are rendered at block 272.

Referring to FIGS. 4A-4Z and 5A-5Z are representative graphical user interfaces for providing intelligent prescriptive analytics in accordance with an embodiment of the present invention, are shown. However, it is understood that other graphical user interfaces may be utilized within the scope of the present invention.

Figure 40:
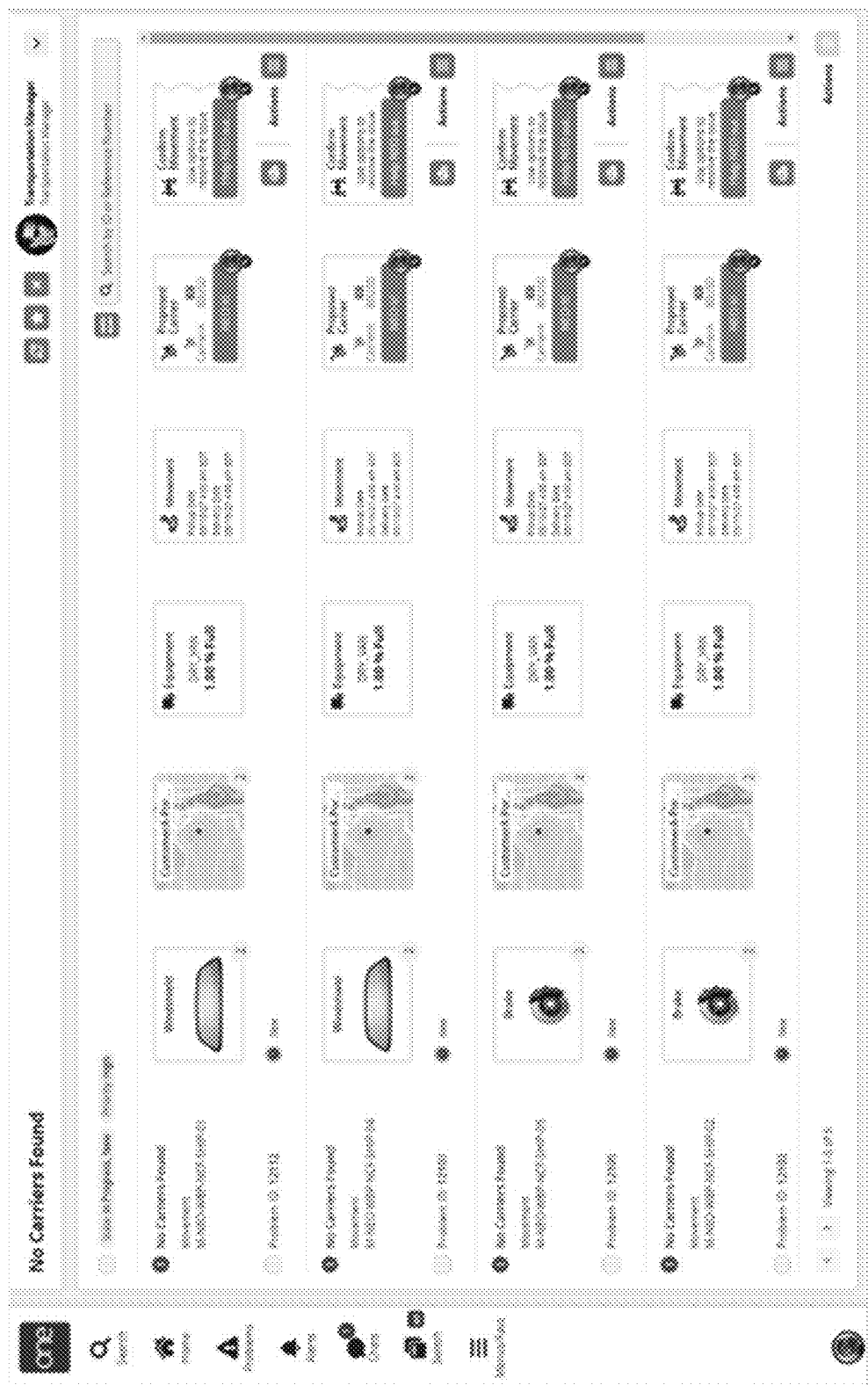
Figure 4P:
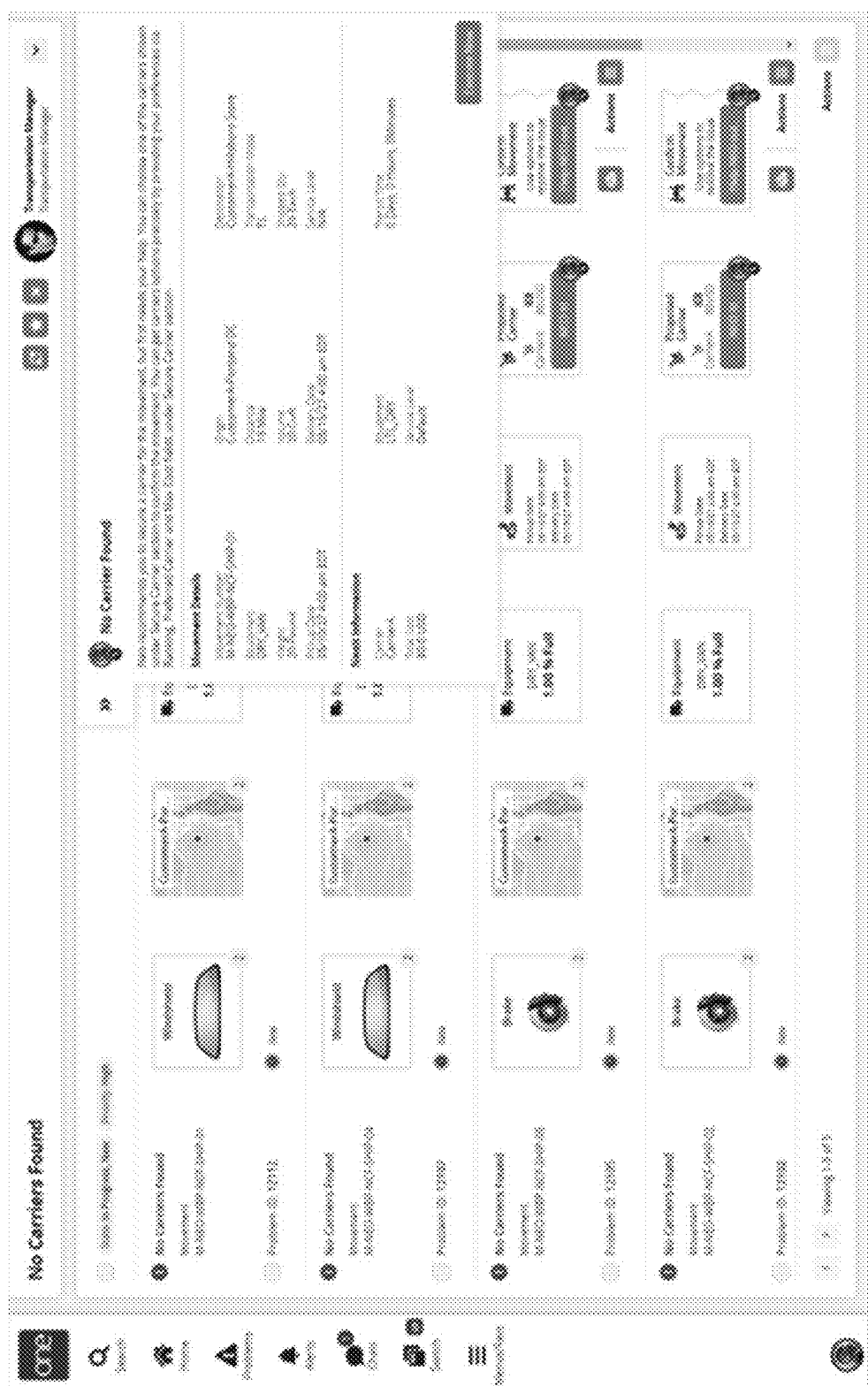
Figure 4Q:
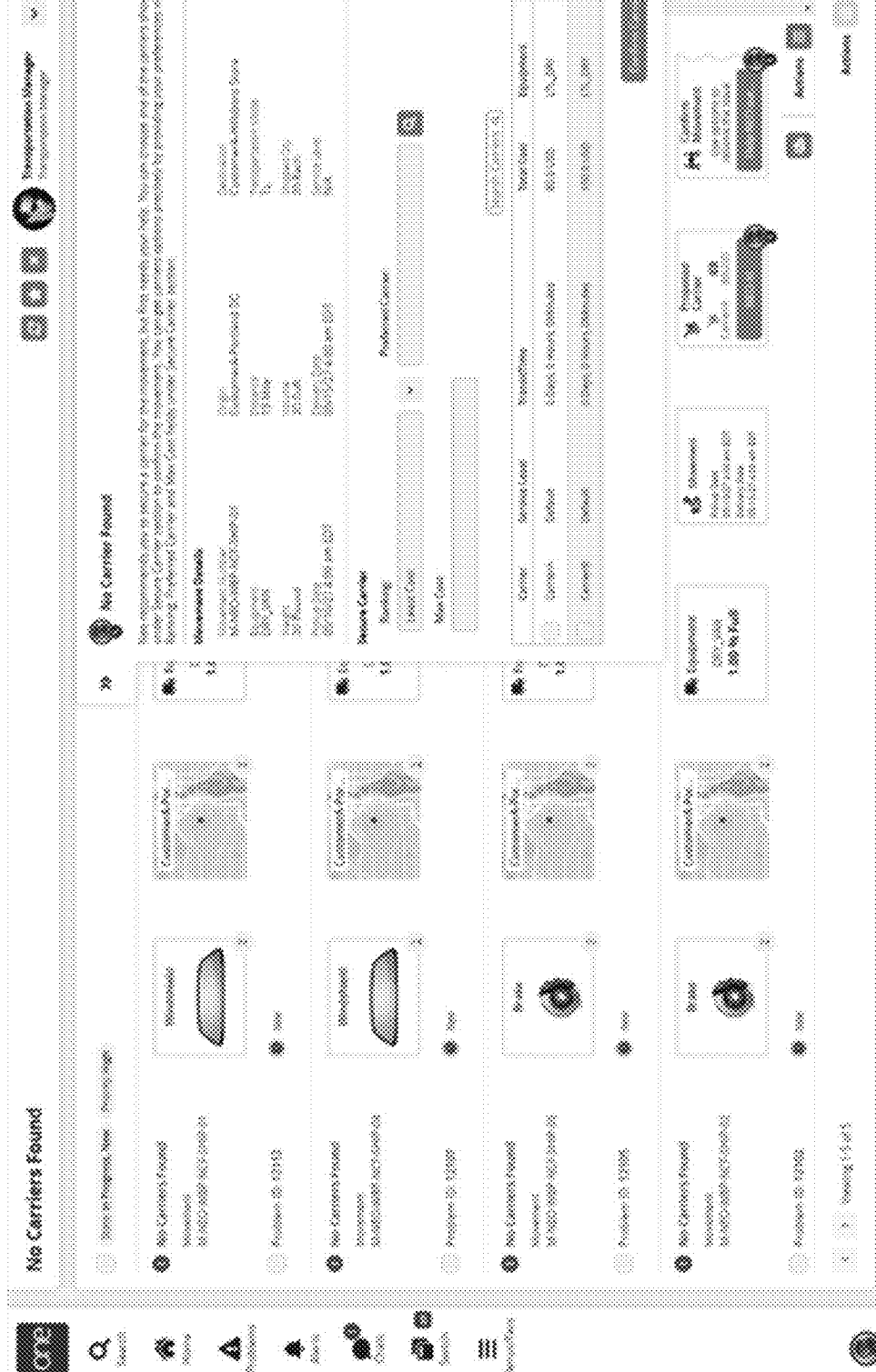
Figure 4S:
Figure 4R:
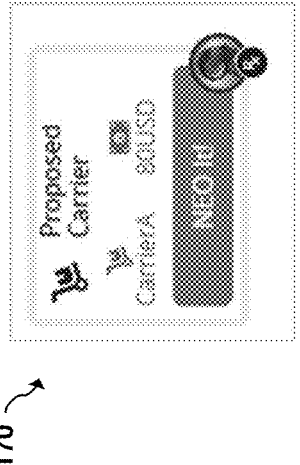

The system may include a graphical user interfaces for a transportation management system, as shown in FIGS. 40-4S, which without limitation allow a user to handle carrier not found problems, and the like. Some of the graphical user interfaces may be automatically generated by the system of the present invention upon a change of state. For instance, as shown in FIG. 4R, a proposed carrier prescription for a carrier not found may be generated by the system. As part of this prescription the present invention scans across all compatible equipment based routes and identifies the available carriers on these routes and then checks the carrier contracts for these carriers and find best possible carrier in terms of cost and confirms the load to that carrier. For example, without limitation, if movement has TL equipment and the system doesn't find any carrier set up for this equipment, then the present invention may scans all compatible TL and LTL equipment for this equipment and finds best carrier available as part of its prescription. Further, as shown in FIG. 4S, a confirm movement prescription for a carrier not found may be generated by the system. As part of this prescription the system pulls all possible carriers across all compatible equipment and allow user to select the appropriate carrier. A user can get more precise carriers options by providing additional preferences by means of ranking (least cost versus least transit time), preferred carrier and maximum cost allowed filters.

Figure 4T:
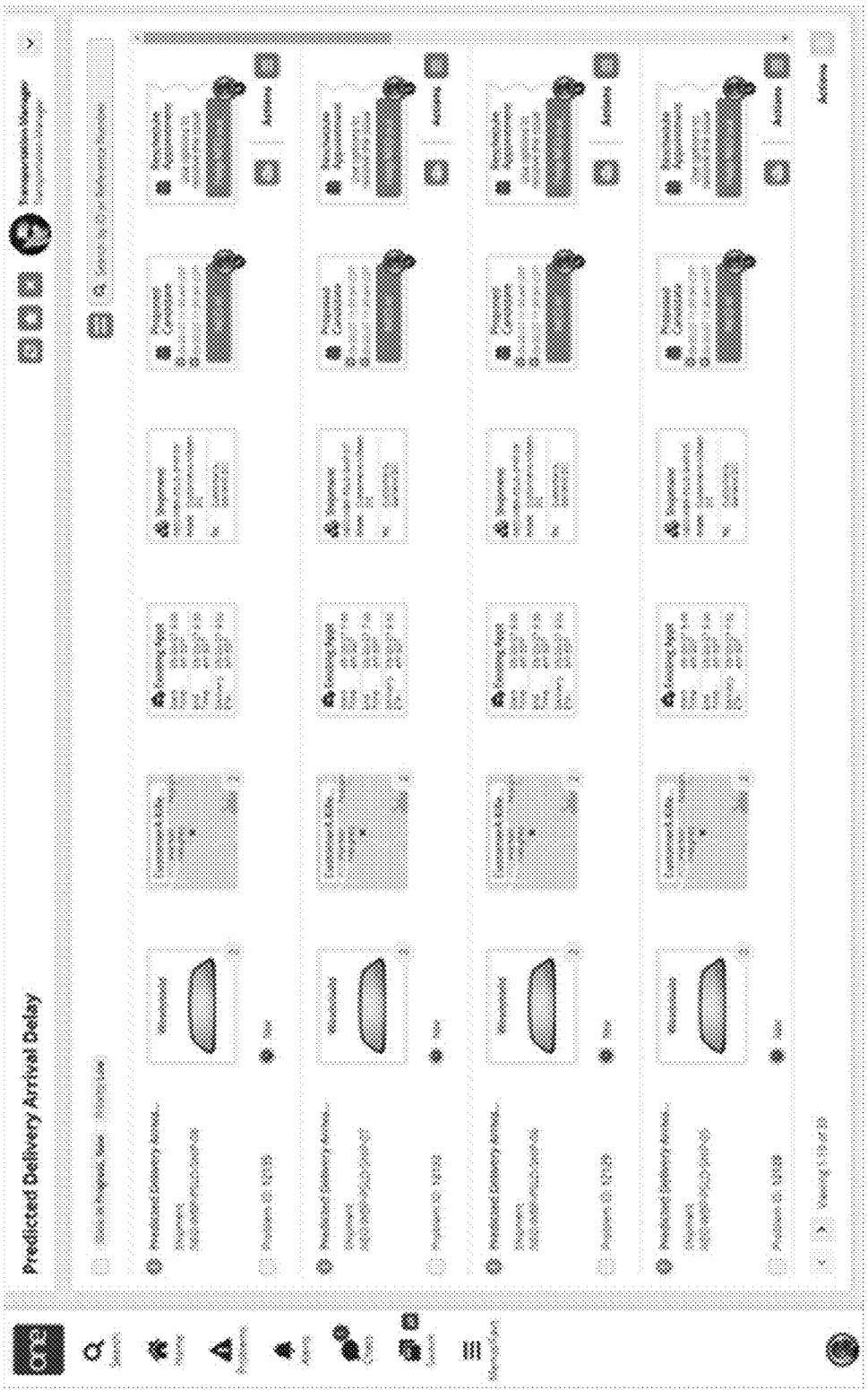
Figure 4U:
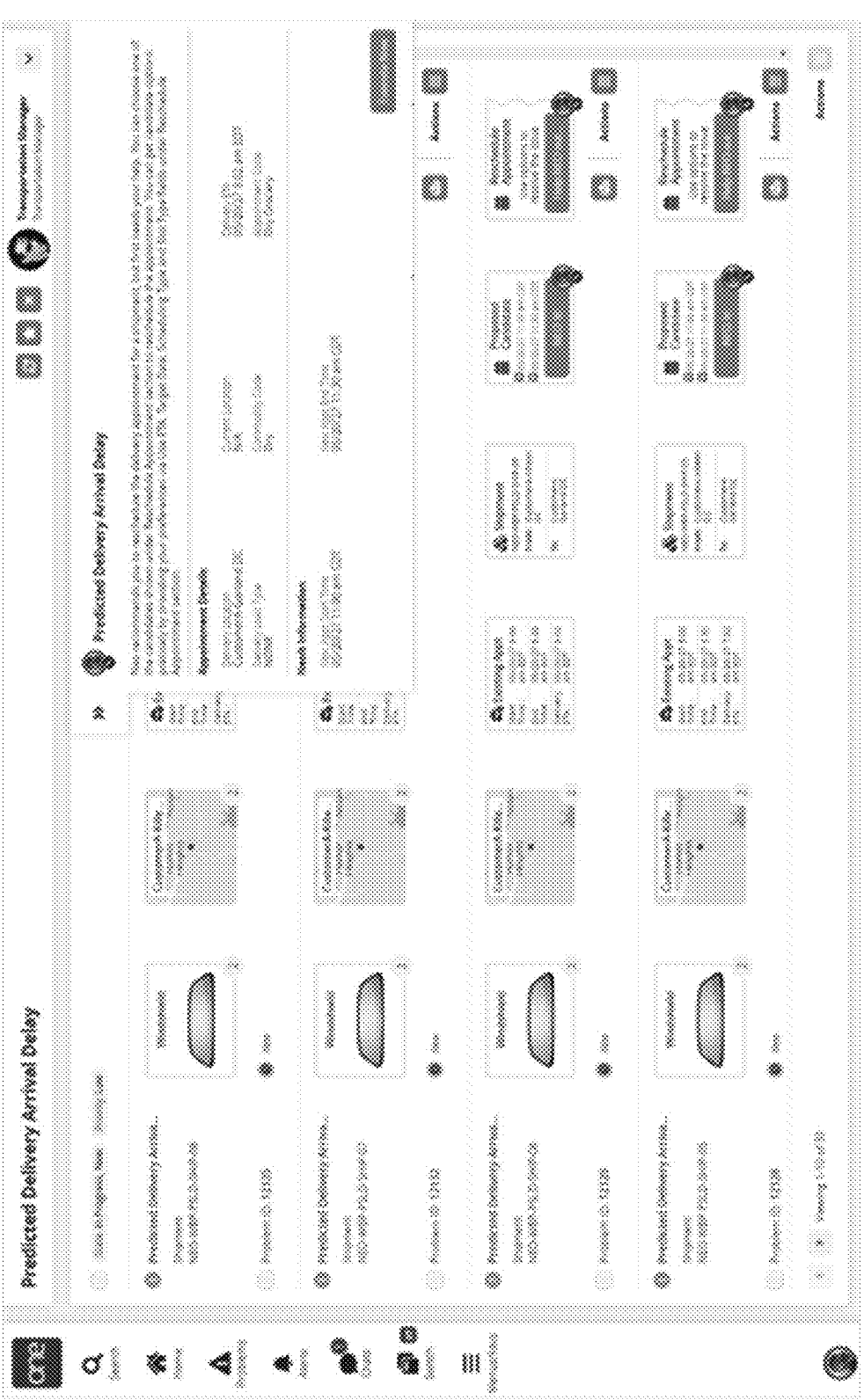
Figure 4V:
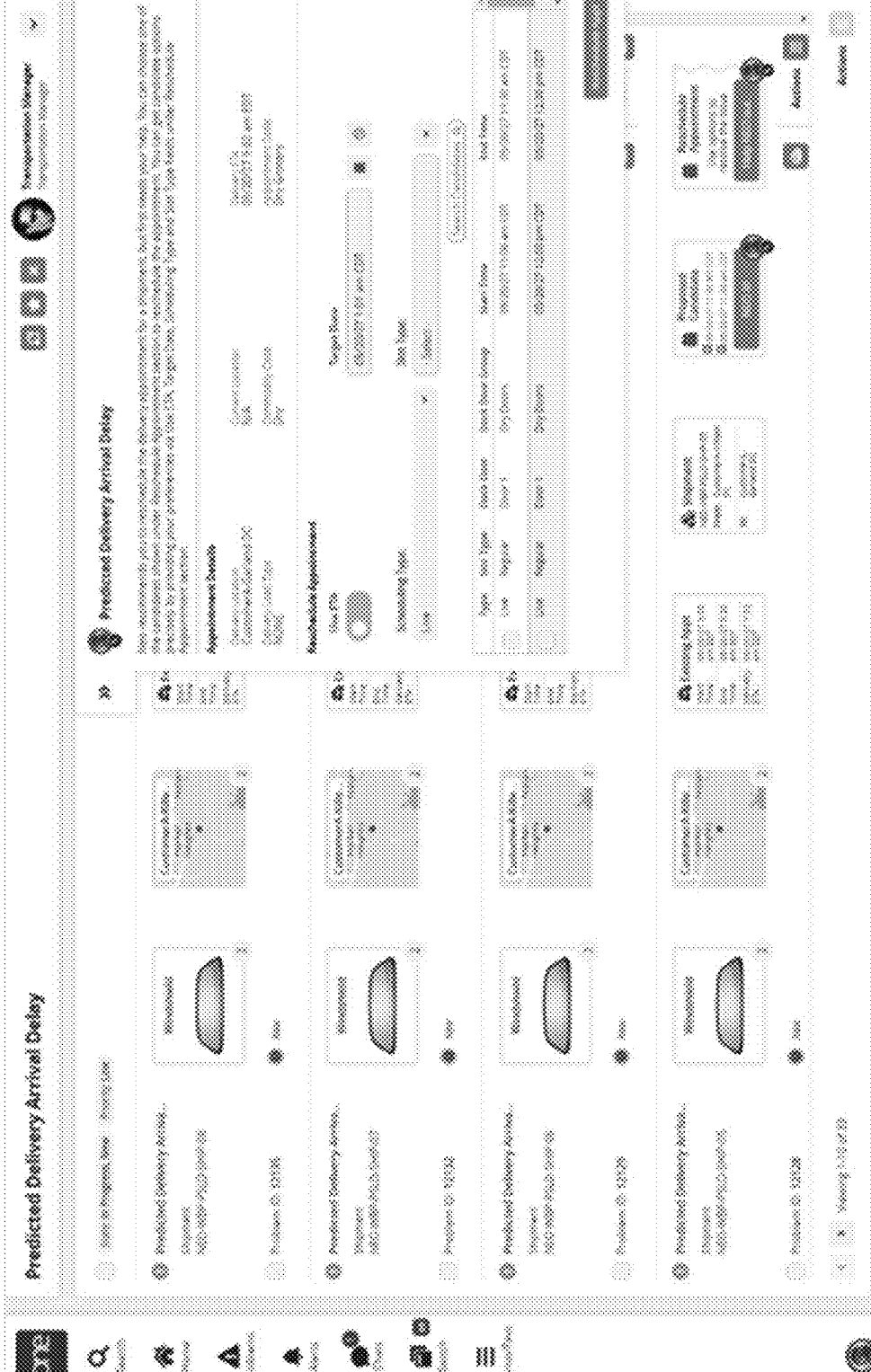
Figure 4X:
Figure 4W:
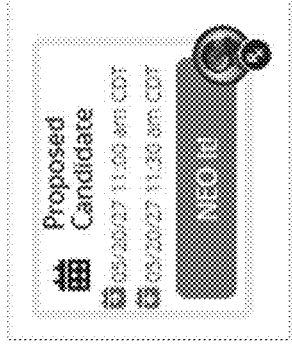
Figure 4Y:
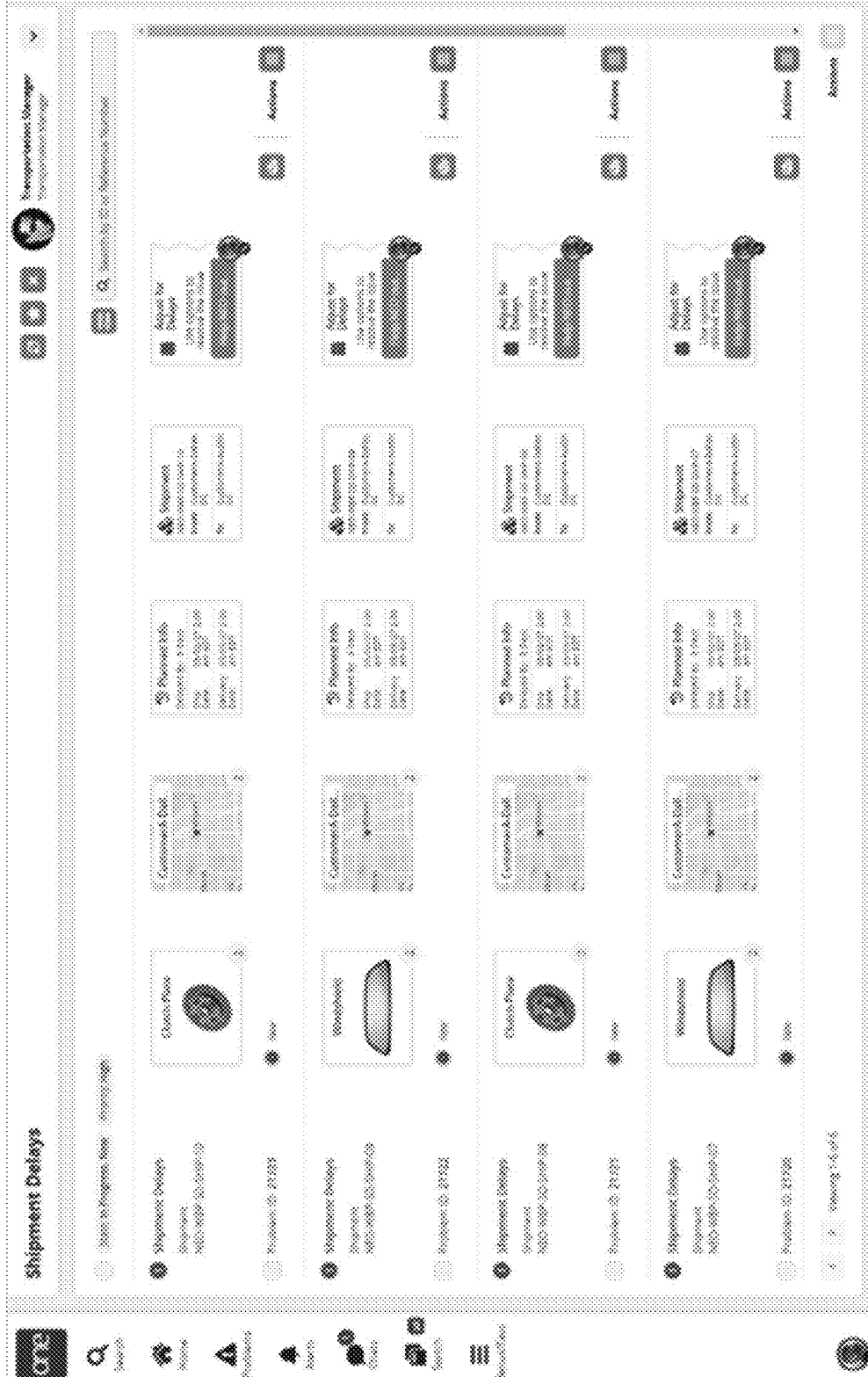
Figure 4Z:
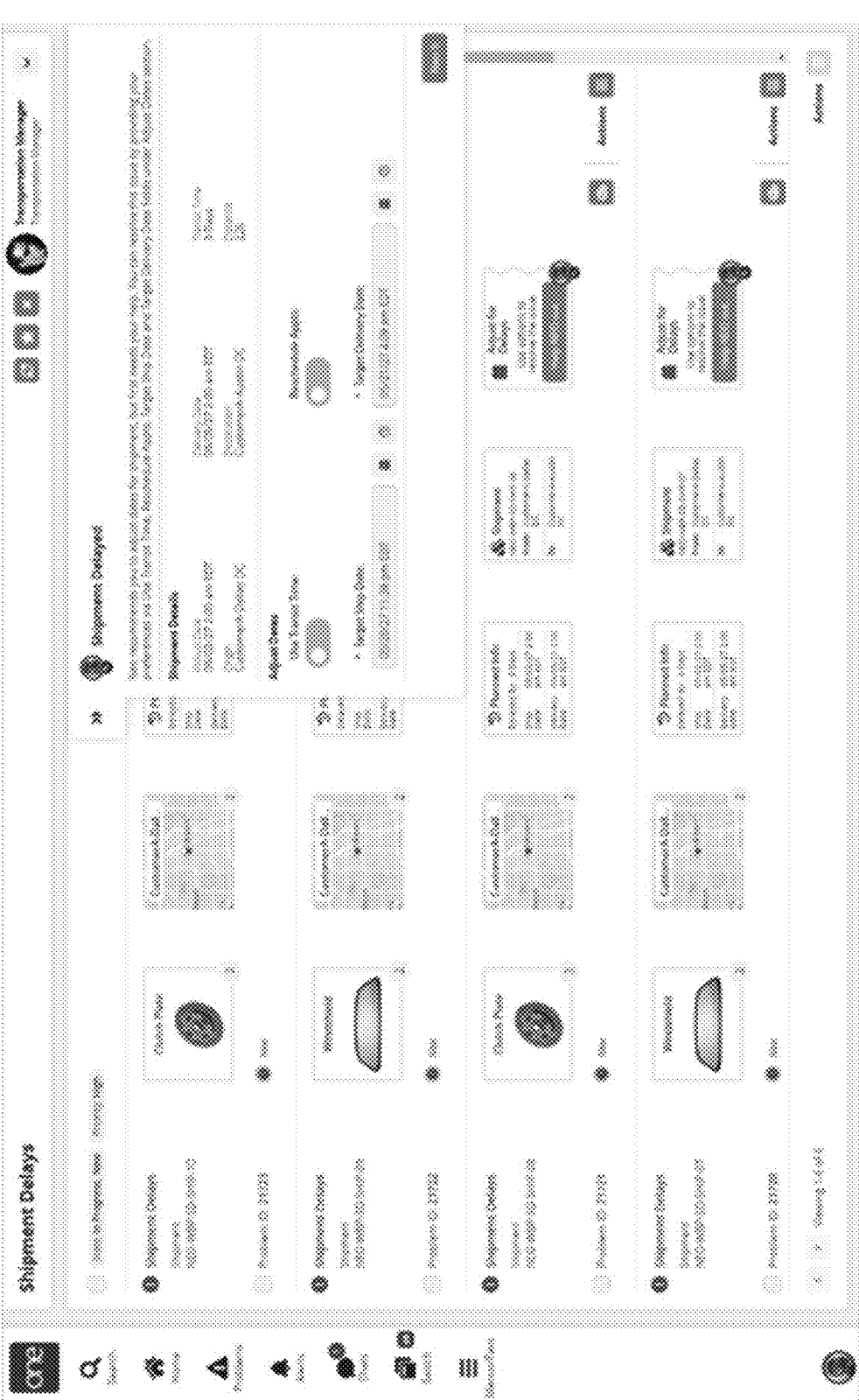

The system may include graphical user interfaces for a transportation management system, as shown in FIGS. 4T-4V, which without limitation allow a user to handle predicted delivery arrival delays, and the like. Some of the graphical user interfaces may be automatically generated by the system of the present invention upon a change of state. For instance, as shown in FIG. 4W, a proposed candidate prescription for a predicted delivery arrival delay may be generated by the system. As part of this prescription, the system consults appointment scheduling engine to identify new possible delivery appointment candidates based on an updated estimated time of arrival (ETA) and selects an available appointment candidate that is closest to the ETA and offers to schedule the appointment at this time. As shown in FIG. 4X, a reschedule appointment prescription for a predicted delivery arrival delay may be generated by the system. As part of this prescription, the system pulls all possible delivery appointment options based on the new ETA and helps user to choose suitable appointment. The user can choose one of the candidates to reschedule the appointment. The user can further refine candidate options by providing preferences via using latest ETA or a specific user inputted target date, scheduling type (live/drop) and slot type (regular/standing block).

Figure 5A:
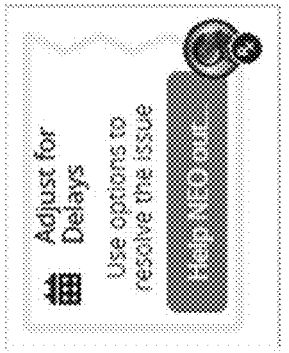
FIGS. 5A-5Z are representative graphical user interfaces for providing intelligent prescriptive analytics in accordance with an embodiment of the present invention.
Figure 5B:
Figure 5C:
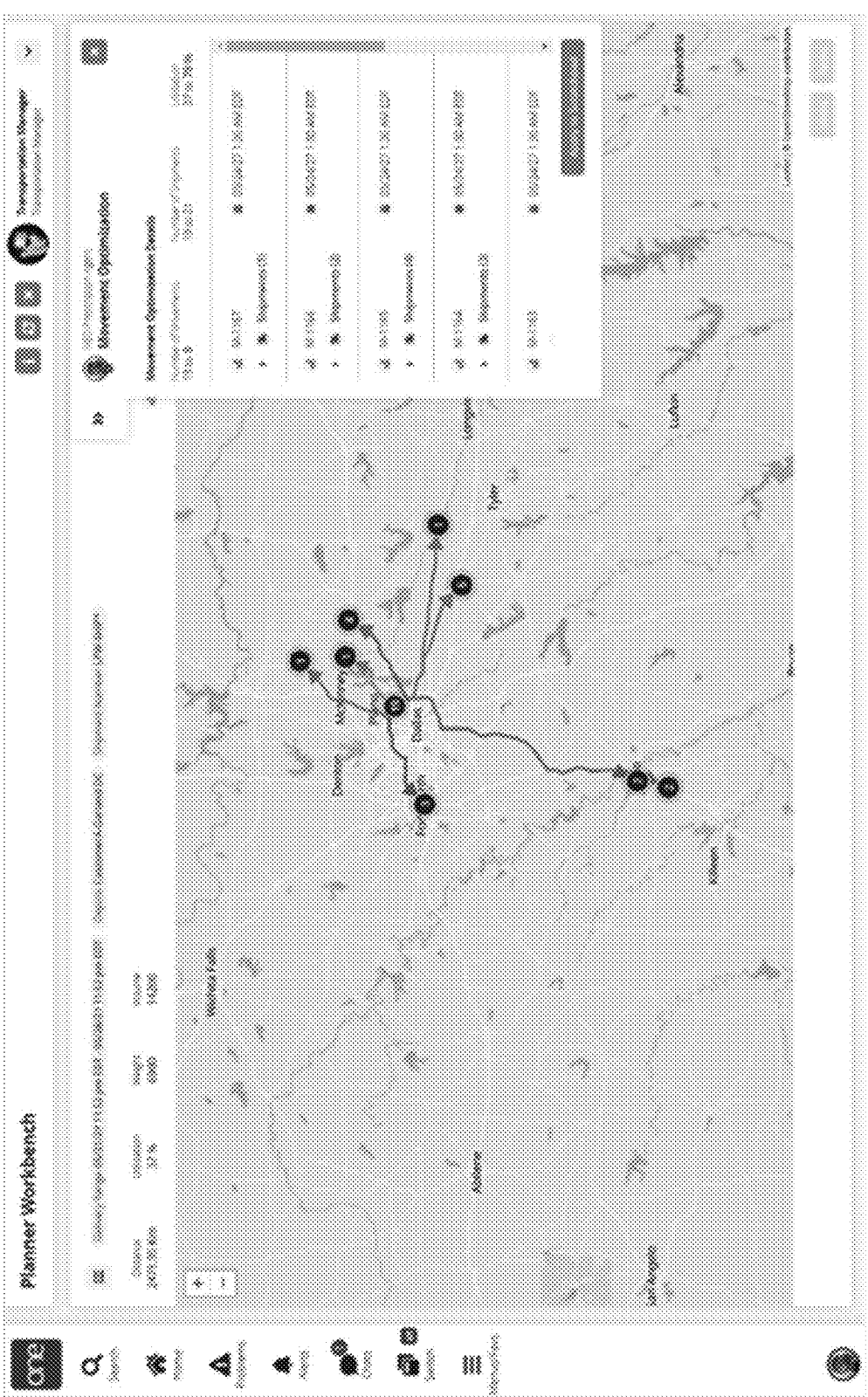

The system may include graphical user interfaces for a transportation management system, as shown in FIGS. 4Y-5A, which without limitation allow a user to handle shipment delays, and the like. Some of the graphical user interfaces may be automatically generated by the system of the present invention upon a change of state. For instance, as shown in FIG. 5A, an adjust for delays prescription for a shipment delay may be generated by the system. The system allows a user to adjust the target delivery date based on updated ETA accounting for the delay. Additionally, if the delay impacts a scheduled appointment, the system allows to reschedule the appointment accounting for the delay.

Figure 5E:
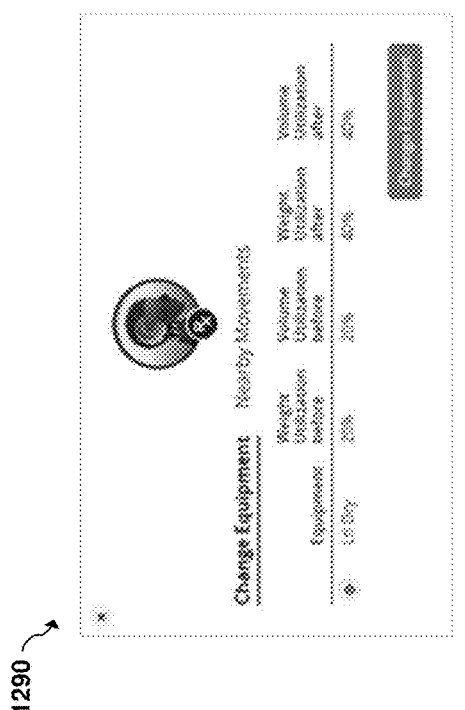
Figure 5G:
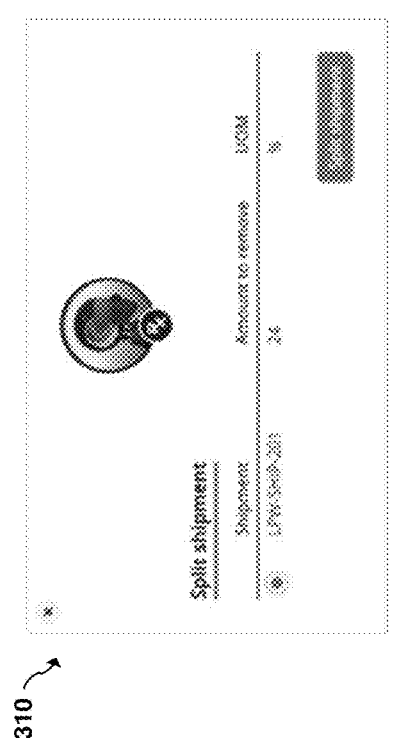
Figure 5D:
Figure 5F:
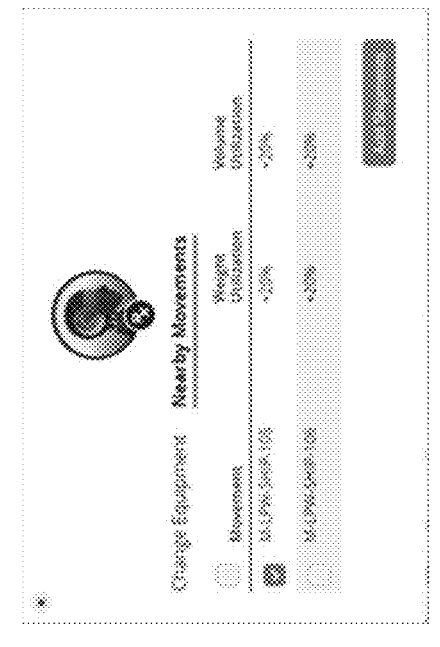
Figure 5H:
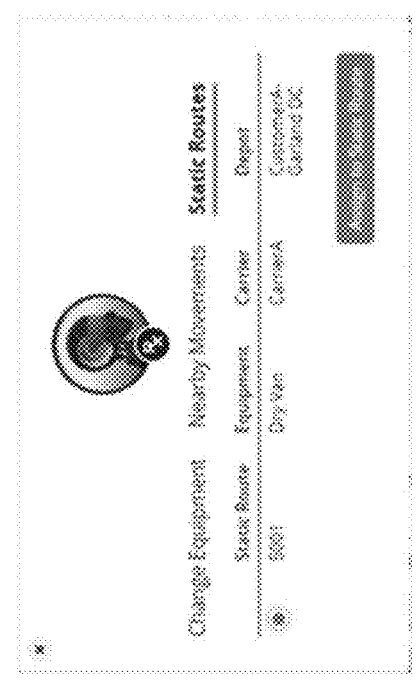
Figure 5I:
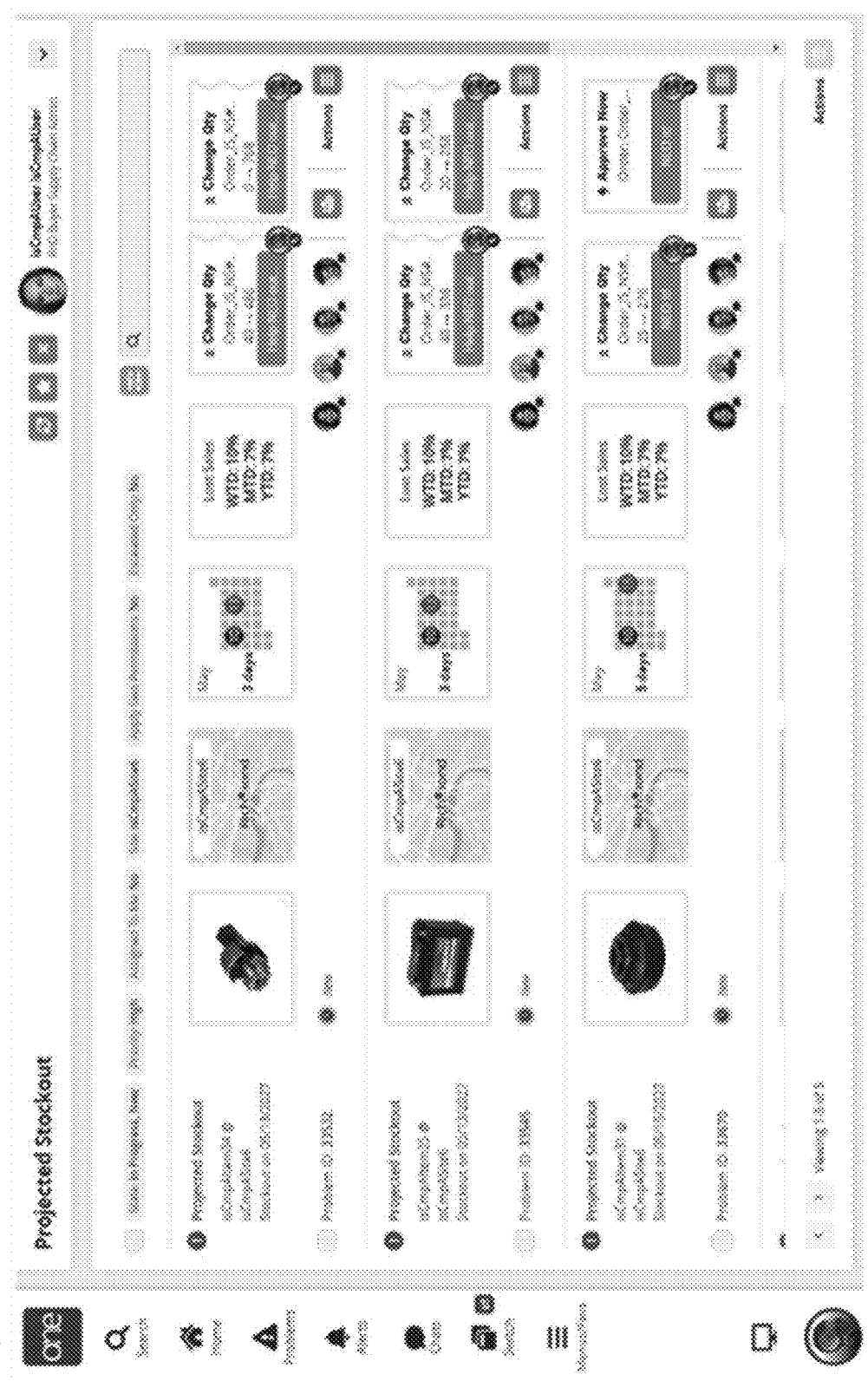
Figure 5J:
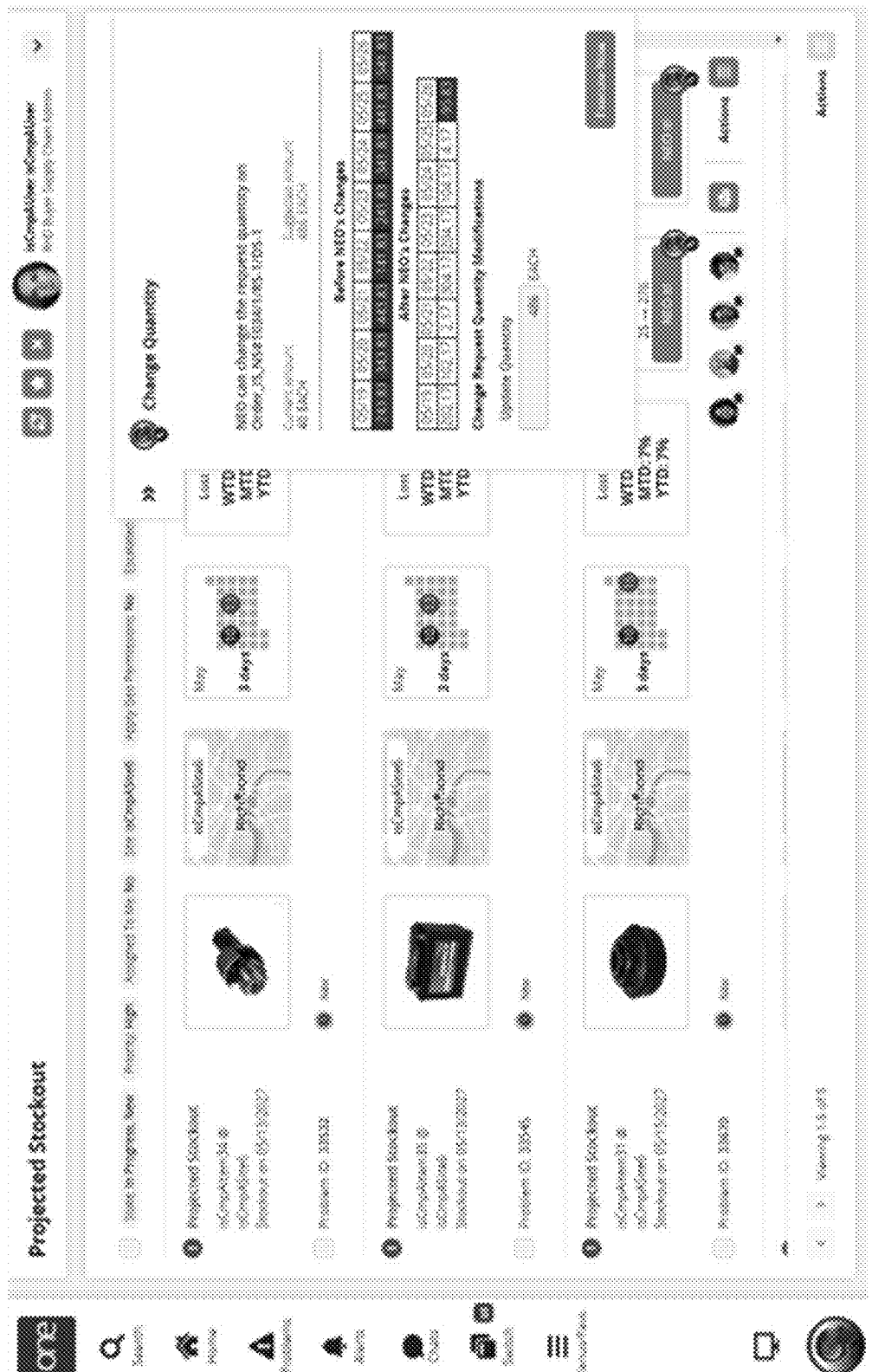
Figure 5K:
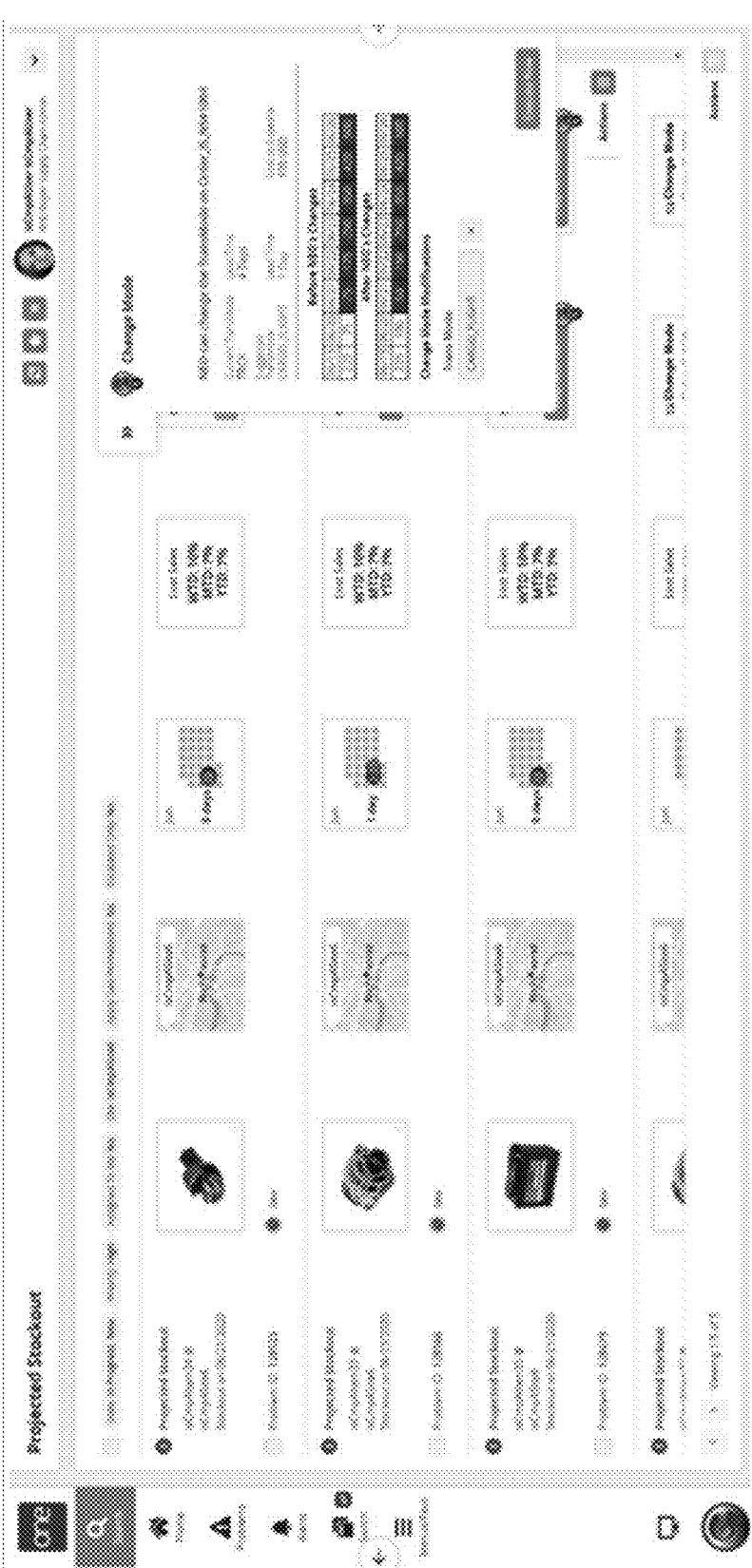
Figure 5L:
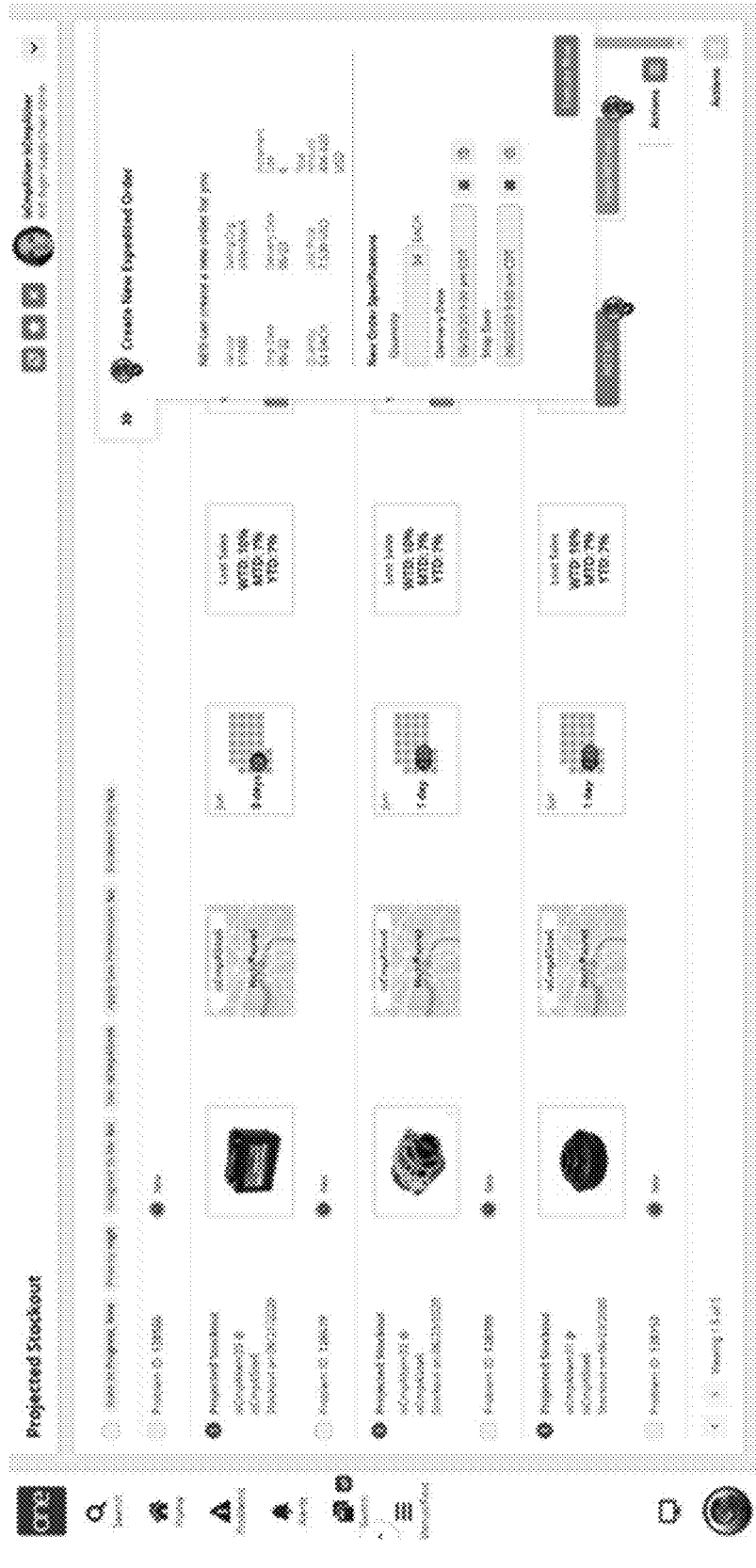
Figure 5M:
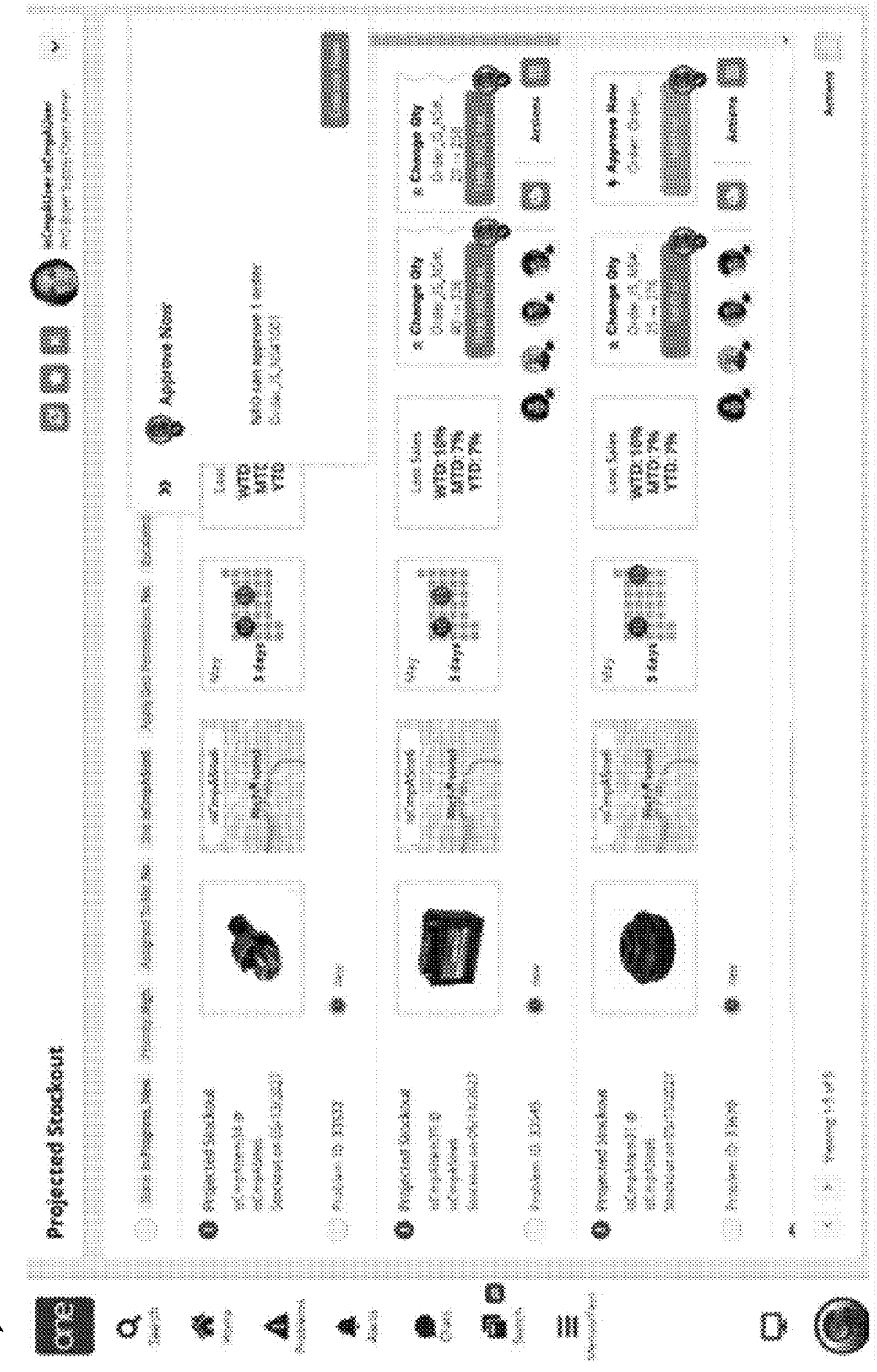
Figure 5O:
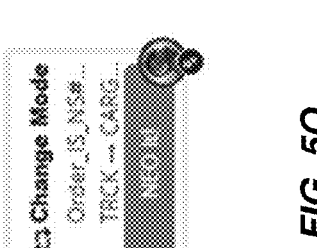

The system may include graphical user interfaces for a transportation management system, as shown in FIGS. 5B-5H, which without limitation provide a planner workbench. Some of the graphical user interfaces may be automatically generated by the system of the present invention upon a change of state. For instance, as shown in FIG. 5D, a movement optimization prescription for the transportation planner workbench may be generated by the system. The system provides movement optimization. Individual movements can be analyzed, along with their shipments. The potential gain in utilization is displayed as well. Users can check the movement optimization details as they pertain to the reduction in the number of movements and shipments, as well as the utilization increase percentage. As shown in FIG. 5E, a change equipment prescription for the transportation planner workbench may be generated by the system. The system senses the movement is not tightly loaded for the current equipment and recommends more appropriate equipment (for instance, scale down from TL equipment to LTL equipment) that tightly fits the movement. As shown in FIG. 5F, a nearby movements prescription for the transportation planner workbench may be generated by the system. The system identifies other potential movements in near by geographical area and recommends to consolidate with current movement to minimize number of trucks, distance travelled and hence total cost. As shown in FIG. 5G, a split shipment prescription for the transportation planner workbench may be generated by the system. The system senses a movement is overweight or over volume for the for the current equipment and recommends splitting shipments under the movement to bring the load to max equipment capacity and create separate shipment(s) for the excess weight/volume so they can be consolidated with other suitable movements. As shown in FIG. 5G, an assign to static route prescription for the transportation planner workbench may be generated by the system. The system identifies suitable static routes for a given movement so movements are executed with dedicated static routes rather than executed as dynamic movements with common carriers.

Figure 5N:
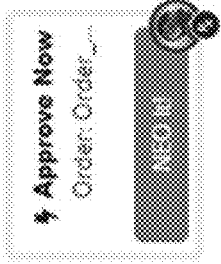
Figure 5P:
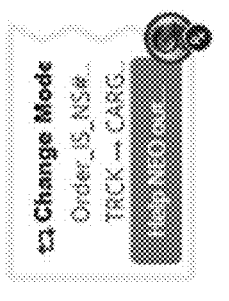
Figure 5R:
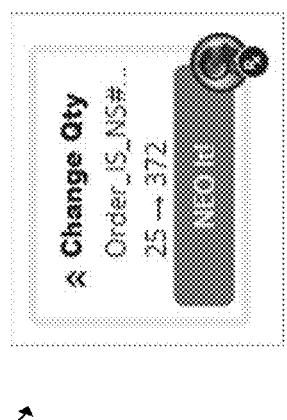
Figure 5Q:
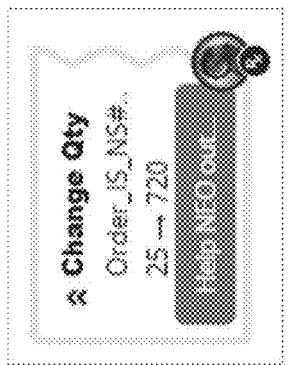
Figure 5S:
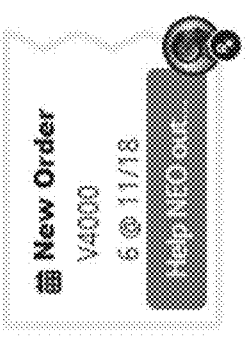
Figure 5T:
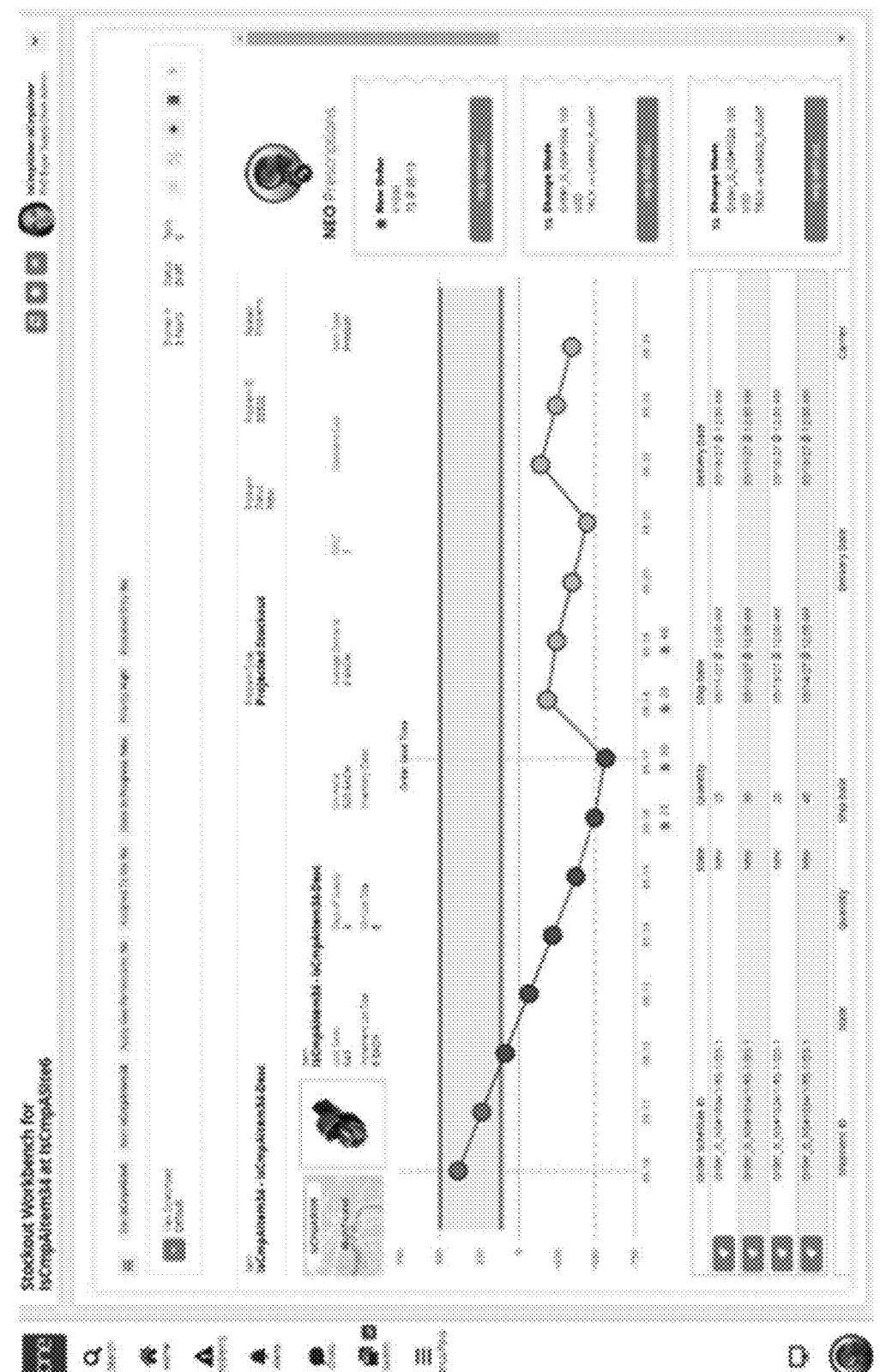
Figure 5V:
Figure 5X:
Figure 5U:
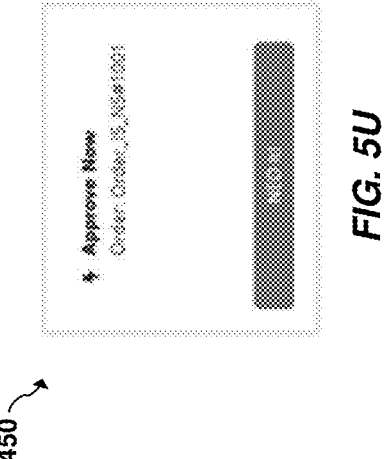
Figure 5W:
Figure 5Z:
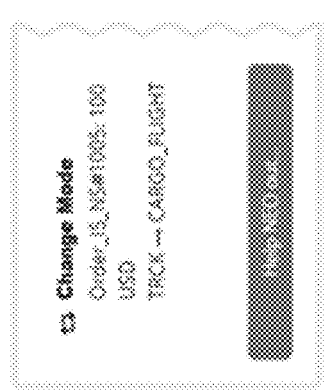
Figure 5Y:
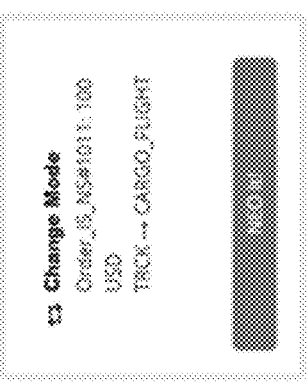

The system may include a graphical user interface for projected stockout, as shown in FIGS. 5I-5S, which without limitation allow a user to change quantities for an order, change the mode of an order, approve an order, and the like. Some of the graphical user interfaces may be automatically generated by the system of the present invention upon a change of state. For instance, as shown in FIG. 5N, an approve now prescription for a projected stockout may be generated by the system for an order which can improve a stockout by approving an order which needs approval. As shown in FIGS. 50-5P, a change mode prescription for a projected stockout may be generated by the system for an order which can improve a stockout by changing the transportation mode to allow the order to arrive early. As shown in FIGS. 5Q-5R, a change quantity prescription for a projected stockout may be generated by the system for an order which can improve a stockout by increasing the quantity on the order. As shown in FIG. 5S, a create new expedited order prescription for a projected stockout may be generated by the system for an order which can improve a stockout creating a new order to cover a missing amount.

It is often important to share the most current information between computer applications over a computer network. Information may be shared between computer applications using either (a) a single version of the truth, or (b) multiple versions of the truth. As used herein, a "single version of the truth" is an arrangement in which the same data in its most current/updated form is accessible by multiple computer applications and/or multiple parties. In order to maintain a single version of truth, any single data element is generally represented in a single location. Conversely, multiple versions of the truth are stored in multiple locations. However, in situations where there are multiple versions of the truth, each of the locations must be updateable simultaneously. Otherwise, by definition, there are at least temporary inconsistencies with respect to the representation of the data. In that case, the information may or may not be the most current. In practice, multiple versions of the truth with simultaneous updating is generally not feasible and a non-stale system cannot be built on such a representation. According to at least one embodiment of the present invention, a single version of the truth is utilized for at least a portion of the information relevant to sales forecasting.

The present invention may utilize one or more computer applications. As used herein, a "computer application" is a computer executable software application of any type that executes processing instructions on a computer or embedded in a processor, and an "application" or "application project" are the files, objects, structures, database resources and other resources used in integrating a computer application into a software platform.

The term "database" as used herein means a collection of data and is not limited to a relational database or even disk-based storage. It includes, without limitation, relational databases, memcache, Hadoop, or any other collection of data now known or developed in the future.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

This invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, portions of the invention may be embodied as a method, device, or computer program product. Accordingly, portions of the present invention may take the form of an entirely hardware embodiment or an embodiment combining software and hardware aspects all generally referred to as a "circuit" or "module."

The present invention includes a computer program product which may be hosted on a computer-usable storage medium having computer-usable program code embodied in the medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Computer program code for carrying out operations of the present invention may be written in any programming language including without limitation, object-oriented programming languages such as Java®, Smalltalk, C# or C++, conventional procedural programming languages such as the "C" programming language, visually oriented programming environments such as VisualBasic, and the like.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A system for providing intelligent prescriptive analytics, the system comprising:

a plurality of remote computers in communication with a respective plurality of remote users;

a service provider computer including:

a computer program stored in non-transient memory, and one or more microprocessors;

a shared database in communication with the service provider computer; and a network interface in communication with the service provider computer and the plurality of remote computers over a shared network, wherein the plurality of remote computers has shared access to the shared database over the shared network, wherein the service provider computer is configured to:

determine a real-time state of the system, wherein the real-time state of the system includes a current prescription list for a given user context;

receive, via the network interface, a set of real-time updates to the real-time state of the system, wherein the set of real-time updates includes:

data from heterogeneous operational systems including a transportation-management system and an appointment-scheduling system, and a set of characteristics associated with a set of transportation equipment, wherein the set of characteristics is generated from a set of scans of the set of transportation equipment performed by a set of sensors;

upon receipt of the set of real-time updates to the real-time state of the system, determine whether the set of characteristics meets a transportation requirement, in response to a determination that the set of characteristics does not meet the transportation requirement, determine a potential prescription, wherein:

the potential prescription includes automatically assigning a set of cargo from a first piece of equipment of the set of transportation equipment to a second piece of equipment of the set of transportation equipment, if a prescriptive outcome may be inferred, the potential prescription is set based on the inferred prescriptive outcome, if the prescriptive outcome cannot be inferred, the potential prescription is set based on a simulated prescriptive outcome, and determination of the simulated prescriptive outcome includes:

creating a simulation via a network scratchpad;

determining one or more potential simulation prescription outcomes within the network scratchpad, wherein the one or more potential simulation prescription outcomes show an impact of the potential prescription across the system;

computing, for a plurality of movements, candidate transportation reassignments by scanning compatible-equipment-based routes and carrier-contract constraints;

simulating cumulative outcomes including appointment-schedule changes produced by an appointment-scheduling engine;

determining the potential prescription based on the one or more potential simulation prescription outcomes; and removing the network scratchpad;

determine whether the potential prescription is within a predefined prescription value threshold;

in response to the potential prescription being within the predefined prescription value threshold, add the potential prescription to a potential prescription list for the given user context;

compare the current prescription list for the given user context with the potential prescription list for the given user context to determine (i) which prescriptions to add, (ii) which prescriptions to modify, and (iii) which prescriptions to recall, based on differences between the current prescription list for the given user context and the potential prescription list for the given user context;

determine whether the predefined prescription value threshold and policy constraints are satisfied; and in response to a determination that the predefined prescription value threshold and policy constraints are satisfied:

automatically transmit machine-readable instructions to the transportation-management system and the appointment-scheduling system to effect execution of added or modified prescriptions; and perform the added prescriptions and the modified prescriptions in the given user context.

2. The system of claim 1, wherein each user of the respective plurality of remote users represents one of a plurality of entities in a value chain.

3. The system of claim 1, wherein the determination of the simulated prescriptive outcome includes recall and regeneration of a prescription.

4. The system of claim 1, wherein determining one or more potential simulation prescription outcomes within the network scratchpad is automatically precomputed based on the real-time state of the system.

5. The system of claim 1, wherein a plurality of potential prescriptions are presented to a user based on, and ranked by, which prescriptions have been previously executed by the user in a similar given context using machine learning.

6. The system of claim 1, wherein a dynamic sequence of prescriptions is executed in sequence.

7. The system of claim 6, wherein an overall potential impact of the dynamic sequence of prescriptions is determined and presented to a user before execution of the dynamic sequence of prescriptions.

8. The system of claim 1, wherein the set of real-time updates includes at least one of:

a movement-tracking update, a carrier-capacity update, an equipment-availability update, or an appointment-slot availability update for shipments.

9. The system of claim 1, wherein computing the candidate transportation reassignments includes:

scanning the compatible-equipment-based routes, and checking carrier contracts for the compatible-equipment-based routes prior to ranking candidates.

10. The system of claim 1, wherein simulating the cumulative outcomes includes:

requesting, from an appointment-scheduling engine, candidate delivery appointment slots nearest to an updated estimated time of arrival (ETA), and tentatively reserving a selected slot in the network scratchpad.

11. The system of claim 1, wherein the automatically transmitted machine-readable instructions include:

a carrier-reassignment instruction to a transportation-management system, and an appointment-reschedule instruction to a dock-scheduling system.

12. The system of claim 1, wherein the system is configured to, responsive to committing a prescription:

recall or re-rank previously presented prescriptions that are inconsistent with committed changes and render an updated ordered list for a user context.

13. The system of claim 1, wherein the system is configured to:

generate a default executable prescription, and auto-execute the default executable prescription without user input upon satisfaction of policy constraints.

14. The system of claim 1, wherein the potential prescriptions include at least one of:

nearby-movement consolidation, overweight split, over-volume split, or static-route assignment, each with simulated network impact prior to commit.

15. The system of claim 1, wherein ranking the potential prescriptions includes weighting based on prior user selections in similar contexts.

16. The system of claim 1, wherein determining whether to auto-execute includes verifying contractual-compliance constraints and user-defined policy thresholds prior to transmission of instructions.

* * * * *